United States Patent
Okada et al.

(10) Patent No.: US 9,839,973 B2
(45) Date of Patent: Dec. 12, 2017

(54) FRICTION STIR SPOT WELDING APPARATUS, FRICTION STIR SPOT WELDING METHOD, AND PERPENDICULAR-TO-PLANE DETECTION DEVICE FOR USE IN FRICTION STIR SPOT WELDING

(71) Applicant: KAWASAKI JUKOGYO KABUSHIKI KAISHA, Kobe-shi, Hyogo (JP)

(72) Inventors: Hideki Okada, Kakamigahara (JP); Ryoji Ohashi, Kobe (JP); Satoru Yamasumi, Itami (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/108,347

(22) PCT Filed: Dec. 27, 2013

(86) PCT No.: PCT/JP2013/007674
§ 371 (c)(1),
(2) Date: Jun. 27, 2016

(87) PCT Pub. No.: WO2015/097727
PCT Pub. Date: Jul. 2, 2015

(65) Prior Publication Data
US 2016/0318120 A1   Nov. 3, 2016

(51) Int. Cl.
*B23K 20/12* (2006.01)

(52) U.S. Cl.
CPC .......... *B23K 20/123* (2013.01); *B23K 20/125* (2013.01); *B23K 20/126* (2013.01); *B23K 20/1245* (2013.01)

(58) Field of Classification Search
CPC ...................................... B23K 20/122–20/128
(Continued)

(56) References Cited

U.S. PATENT DOCUMENTS 6,583,869 B1    6/2003  Sheridan
8,544,714 B1 *  10/2013 Obaditch ............. B23K 20/123
                                        228/102

(Continued)

FOREIGN PATENT DOCUMENTS

JP    H01-251519 A      10/1989
JP    3262163 B2  *    3/2002   ........... B23K 20/126
(Continued)

OTHER PUBLICATIONS

Mar. 25, 2014 Search Report issued in International Patent Application No. PCT/JP2013/007674.
(Continued)

*Primary Examiner* — Kiley Stoner
(74) *Attorney, Agent, or Firm* — Oliff PLC

(57) ABSTRACT

A friction stir spot welding apparatus according to the present invention includes: a rotary tool; and a perpendicular-to-plane detector, which detects whether or not the rotary tool is positioned to be in a perpendicular-to-plane state relative to a joining target portion of workpieces. The perpendicular-to-plane detector measures distances to at least three measurement positions set around the joining target portion by means of, for example, position sensors. The measurement positions are set to be positioned at the vertices of a polygon on a reference plane to which forward and backward movement directions of the rotary tool are normal. The perpendicular-to-plane detector detects that the rotary tool is positioned to be in the perpendicular-to-plane
(Continued)

state relative to the joining target portion of the workpieces if all the distances to the measurement positions are equal to each other.

14 Claims, 18 Drawing Sheets

(58) Field of Classification Search
USPC ............. 228/112.1, 2.1, 102–103, 105, 8–12
See application file for complete search history.

(56) References Cited

U.S. PATENT DOCUMENTS

| | | | | |
|---|---|---|---|---|
| 2002/0050508 A1* | 5/2002 | Yoshinaga | ............ | B23K 20/123 228/112.1 |
| 2002/0145031 A1* | 10/2002 | Hirano | ................. | B23K 20/125 228/112.1 |
| 2002/0158109 A1* | 10/2002 | Gendoh | ............... | B23K 20/123 228/112.1 |
| 2008/0073409 A1* | 3/2008 | Ostersehlte | .......... | B23K 20/123 228/102 |
| 2009/0272788 A1* | 11/2009 | Fukushima | ........ | B23K 20/1245 228/2.1 |
| 2009/0294511 A1* | 12/2009 | Fleming | ............... | B23K 20/125 228/103 |
| 2012/0118937 A1* | 5/2012 | Enzaka | ................ | B23K 20/123 228/112.1 |
| 2013/0112736 A1 | 5/2013 | Kato | | |
| 2015/0231734 A1* | 8/2015 | Okada | .................. | B23K 20/123 228/2.1 |

FOREIGN PATENT DOCUMENTS

| | | | | |
|---|---|---|---|---|
| JP | 2002301580 A | * | 10/2002 | ........... B23K 20/123 |
| JP | 2004136305 A | * | 5/2004 | |
| JP | 2006-289477 A | | 10/2006 | |
| JP | WO 2012081100 A1 | * | 6/2012 | ........... B23K 20/125 |
| JP | 2012-196681 A | | 10/2012 | |
| JP | 2014193485 A | * | 10/2014 | |

OTHER PUBLICATIONS

Jun. 28, 2016 International Preliminary Report on Patentability issued in International Patent Application No. PCT/JP2013/007674.
Sep. 6, 2017 Search Report issued in European Patent Application No. 13900251.3.

* cited by examiner

FRICTION STIR SPOT WELDING APPARATUS, FRICTION STIR SPOT WELDING METHOD, AND PERPENDICULAR-TO-PLANE DETECTION DEVICE FOR USE IN FRICTION STIR SPOT WELDING

TECHNICAL FIELD

The present invention relates to a friction stir spot welding apparatus, a friction stir spot welding method, and a perpendicular-to-plane detection device for use in friction stir spot welding. The present invention particularly relates to a friction stir spot welding apparatus and a friction stir spot welding method that are capable of detecting that a rotary tool for use in friction stir spot welding is in a perpendicular-to-plane state relative to a joining target portion of workpieces, and to a perpendicular-to-plane detection device for use in the detection.

BACKGROUND ART

In transport vehicles such as automobiles, railcars, and aircrafts, spot welding or rivet connection has been used for coupling metal members together. However, in recent years, friction stir spot welding, in which metal members are joined together by utilizing frictional heat, has been drawing attention.

In friction stir spot welding, a columnar rotary tool (welding tool) is used. The rotary tool is configured to be movable to forward and backward relative to workpieces. The rotary tool is, while rotating at a high speed, pushed (press-fitted) into the workpieces (metal members). The metal members become softened at their portion into which the rotary tool is press-fitted. By stirring the softened metal members, the workpieces are joined together.

It is known that in order to realize joining with higher quality by such friction stir spot welding, it is necessary to suitably control the displacement of the rotary tool when the rotary tool makes forward/backward movement.

For example, Patent Literature 1 discloses a technique in which: the amount of insertion of a friction stir welding tool (rotary tool) inserted into a layered portion (formed by layering a plurality of members together) is measured; and the displacement of the friction stir welding tool is controlled such that the actual measurement value coincides with a target value. Patent Literature 2 discloses control that is performed in double-acting friction stir spot welding, the control being performed in the following manner: in a case where a clamp member is provided on the outside of a shoulder member, calculate a distance between the tip of the clamp member and the tip of a rotary tool (a pin member or shoulder member), thereby adjusting the press-fit depth of the rotary tool.

CITATION LIST

Patent Literature

PTL 1: Japanese Laid-Open Patent Application Publication No. 2006-289477
PTL 2: Japanese Laid-Open Patent Application Publication No. 2012-196681

SUMMARY OF INVENTION

Technical Problem

When joining workpieces together by friction stir spot welding, the rotary tool is required to be in a perpendicular-to-plane state relative to a joining target portion of the workpieces. The rotary tool being in a perpendicular-to-plane state relative to the joining target portion means that, whether the joining target portion is part of a flat surface or a curved surface, the rotary tool is positioned along a direction that is normal to a tangent plane (contact plane) that contacts the flat or curved surface at the joining target portion (point).

For example, in the field of aircrafts, there are cases where the perpendicular-to-plane state is very strictly required depending on the type, joining position, etc., of joining target aircraft parts. Therefore, for example, in a case where a friction stir spot welding apparatus is mounted to the arm unit of an industrial robot and is used, teaching of the industrial robot is necessary in order to set the perpendicular-to-plane state, or setting of the perpendicular-to-plane state needs to be confirmed, for each joining target part type or for each joining position. As a result, spot welding work becomes onerous and time-consuming.

Further, in the field of friction stir spot welding, the technique as disclosed in Patent Literature 1, which performs control by actually measuring the displacement (the amount of forward/backward movement) of the rotary tool by a contact sensor or the like at the time of performing joining, and the technique as disclosed in Patent Literature 2, which adjusts the displacement (the depth of press fitting) with reference to the tip of the clamp member, are known. However, no technique has been known for strictly setting the perpendicular-to-plane state of the rotary tool at the time of performing joining.

The present invention has been made in order to solve the above-described problems. An object of the present invention is to provide a technique that makes it possible to readily and simply set the perpendicular-to-plane state of a rotary tool relative to a joining target portion in friction stir spot welding.

Solution to Problem

In order to solve the above-described problems, a friction stir spot welding apparatus according to the present invention is a friction stir spot welding apparatus including a rotary tool that moves forward and backward along a rotational axis, the apparatus pressing a tip of the rotary tool against workpieces and rotating a contacting portion of the tip, the contacting portion being in contact with the workpieces, to soften the workpieces by frictional heat such that the workpieces are stirred and joined together. The friction stir spot welding apparatus includes: a perpendicular-to-plane detector that detects whether or not the rotary tool is positioned to be in a perpendicular-to-plane state relative to a joining target portion of the workpieces. The perpendicular-to-plane detector includes position sensors that are disposed on a reference plane to which forward and backward movement directions of the rotary tool are normal, the position sensors measuring distances to at least three measurement positions that are set around the joining target portion. The perpendicular-to-plane detector is configured to detect, based on the distances to the measurement positions, that the rotary tool is positioned to be in the perpendicular-to-plane state relative to the joining target portion of the workpieces.

According to the above configuration, the perpendicular-to-plane state can be readily detected with a simple configuration. This makes it possible to improve the work efficiency of friction stir spot welding. In addition, if the friction stir spot welding apparatus is applied to, for example, a robotics device, the perpendicular-to-plane state of the rotary tool can be automatically set by controlling the robotics device in such a manner that the perpendicular-to-plane state is detected by the perpendicular-to-plane detector. In this case, the object to be moved by the robotics device may be either the rotary tool or the workpieces.

In addition, the setting of the perpendicular-to-plane state and the friction stir spot welding can be performed continuously if the joining by the rotary tool is performed after the perpendicular-to-plane state is realized. Even during the joining by the rotary tool, the perpendicular-to-plane state can be kept by correcting positional shifts between the rotary tool and the joining target portion. This makes it possible to improve the joining quality and the efficiency of the joining work.

In the friction stir spot welding apparatus with the above-described configuration, the position sensors included in the perpendicular-to-plane detector may be at least three position sensors, and the position sensors may be disposed on the reference plane at respective positions that are equally distant from a center of an forward and backward movement path of the rotary tool.

The friction stir spot welding apparatus with the above-described configuration may include: a backing portion provided at a position that is in the forward movement direction of the rotary tool, the backing portion coming into contact with a back surface of the joining target portion; and a frame portion that retains the backing portion and the rotary tool such that the backing portion and the rotary tool face each other. The perpendicular-to-plane detector may be integrally provided on the backing portion, or may be provided at the position of the backing portion in a replaceable manner.

The friction stir spot welding apparatus with the above-described configuration may include: an arm unit configured to operate in a three-dimensional manner; and an arm control unit that controls operation of the arm unit. The rotary tool and the backing portion may be mounted to the arm unit via the frame portion, and the arm control unit may control the operation of the arm unit such that all the distances to the measurement positions, the distances being measured by the perpendicular-to-plane detector, are equal to each other.

The friction stir spot welding apparatus with the above-described configuration may include a contact sensor that is integrally provided on the backing portion or is provided at the position of the backing portion in a replaceable manner. The arm control unit may control the operation of the arm unit until a contact by the contact sensor is detected.

The friction stir spot welding apparatus with the above-described configuration may include a base portion that is set on a floor in a stationary manner. The rotary tool and the backing portion may be provided on the base portion via the frame portion.

The friction stir spot welding apparatus with the above-described configuration may include: an arm unit configured to operate in a three-dimensional manner and hold the workpieces; and an arm control unit that controls operation of the arm unit. The arm control unit may control the operation of the arm unit such that all the distances to the measurement positions, the distances being measured by the perpendicular-to-plane detector, are equal to each other.

Another friction stir spot welding apparatus according to the present invention is a friction stir spot welding apparatus including a rotary tool that moves forward and backward along a rotational axis, the apparatus pressing a tip of the rotary tool against workpieces and rotating a contacting portion of the tip, the contacting portion being in contact with the workpieces, to soften the workpieces by frictional heat such that the workpieces are stirred and joined together. The friction stir spot welding apparatus may include: a backing portion provided at a position that is in an forward movement direction of the rotary tool, the backing portion coming into contact with a back surface of the joining target portion; a frame portion that retains the backing portion and the rotary tool such that the backing portion and the rotary tool face each other; and a perpendicular-to-plane detector that detects whether or not the rotary tool is positioned to be in a perpendicular-to-plane state relative to the joining target portion of the workpieces. The perpendicular-to-plane detector may include position sensors that are disposed on a reference plane to which a normal line of a contact surface of the backing portion is normal, the position sensors measuring distances to at least three measurement positions that are set around the joining target portion. The perpendicular-to-plane detector may be configured to detect that the rotary tool is positioned to be in the perpendicular-to-plane state relative to the joining target portion of the workpieces if all the distances to the measurement positions are equal to each other.

In the friction stir spot welding apparatus with the above-described configuration, the position sensors included in the perpendicular-to-plane detector may be configured to measure distances to four measurement positions that are set around the joining target portion.

In the friction stir spot welding apparatus with the above-described configuration, the position sensors may be configured as non-contact sensors.

A friction stir spot welding method according to the present invention is a friction stir spot welding method including a rotary tool that moves forward and backward along a rotational axis, the method including pressing a tip of the rotary tool against workpieces and rotating a contacting portion of the tip, the contacting portion being in contact with the workpieces, to soften the workpieces by frictional heat such that the workpieces are stirred and joined together. The friction stir spot welding method includes: measuring distances to at least three measurement positions that are set around the joining target portion on a reference plane to which forward and backward movement directions of the rotary tool are normal; and detecting that the rotary tool is positioned to be in a perpendicular-to-plane state relative to the joining target portion of the workpieces if all the distances to the measurement positions, the distances being measured before or while the workpieces are being joined together at the joining target portion by the rotary tool, are equal to each other.

A perpendicular-to-plane detection device for use in friction stir spot welding according to the present invention is provided in a friction stir spot welding apparatus, the friction stir spot welding apparatus including a rotary tool that moves forward and backward along a rotational axis, the apparatus pressing a tip of the rotary tool against workpieces and rotating a contacting portion of the tip, the contacting portion being in contact with the workpieces, to soften the workpieces by frictional heat such that the workpieces are stirred and joined together. The perpendicular-to-plane detection device includes position sensors that are disposed on a reference plane to which forward and backward movement directions of the rotary tool are normal, the position sensors measuring distances to at least three measurement positions that are set around the joining target portion. The perpendicular-to-plane detection device detects that the rotary tool is positioned to be in a perpendicular-to-plane state relative to the joining target portion of the workpieces if all the distances to the measurement positions are equal to each other.

The above object, other objects, features, and advantages of the present invention will be made clear by the following detailed description of preferred embodiments with reference to the accompanying drawings.

Advantageous Effects of Invention

The present invention, with the above-described configuration, has an advantage of being able to provide a technique that makes it possible to readily and simply set the perpendicular-to-plane state of the rotary tool relative to the joining target portion when performing friction stir spot welding.

DESCRIPTION OF EMBODIMENTS

Figure 1A:
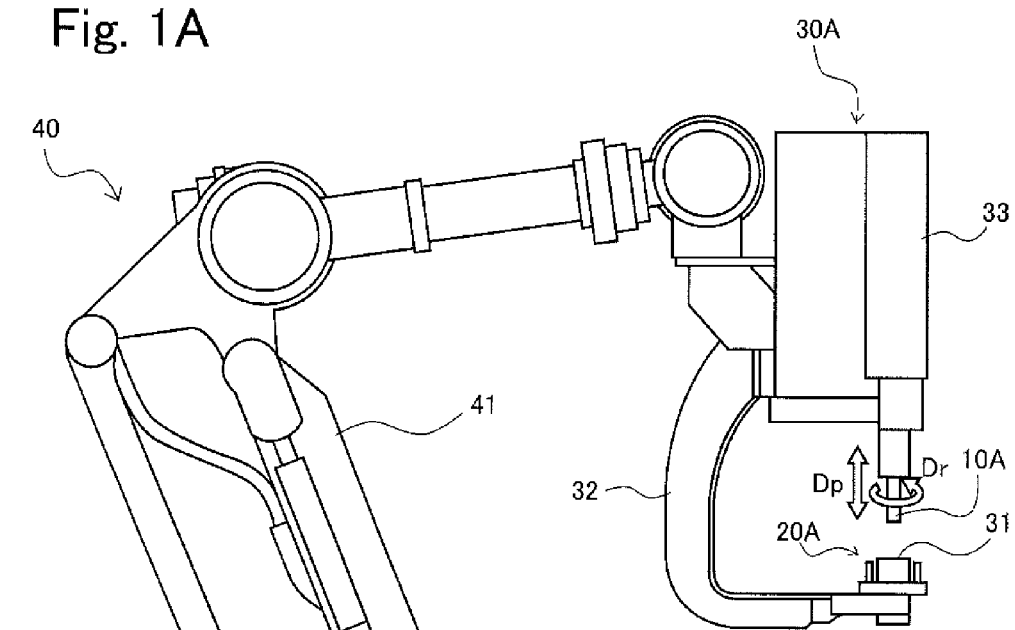
FIG. 1A is a schematic diagram showing one example of a friction stir spot welding apparatus according to Embodiment 1 of the present invention and showing a configuration in which a friction stir spot welding unit is mounted to an arm unit of a robotics device.

Hereinafter, preferred embodiments of the present invention are described with reference to the drawings. In the drawings, the same or corresponding elements are denoted by the same reference signs, and repeating the same descriptions is avoided below.

Embodiment 1

[Configuration of Friction Stir Spot Welding Apparatus]

First, a typical configuration of a friction stir spot welding apparatus according to Embodiment 1 of the present invention is specifically described with reference to FIG. 1A, FIG. 1B, and FIG. 2.

As shown in an overall schematic diagram of FIG. 1A, the friction stir spot welding apparatus according to the present embodiment is configured such that a friction stir spot welding unit 30A, which performs friction stir spot welding, is mounted to the tip of an arm unit 41 of a robotics device 40.

Figure 1B:
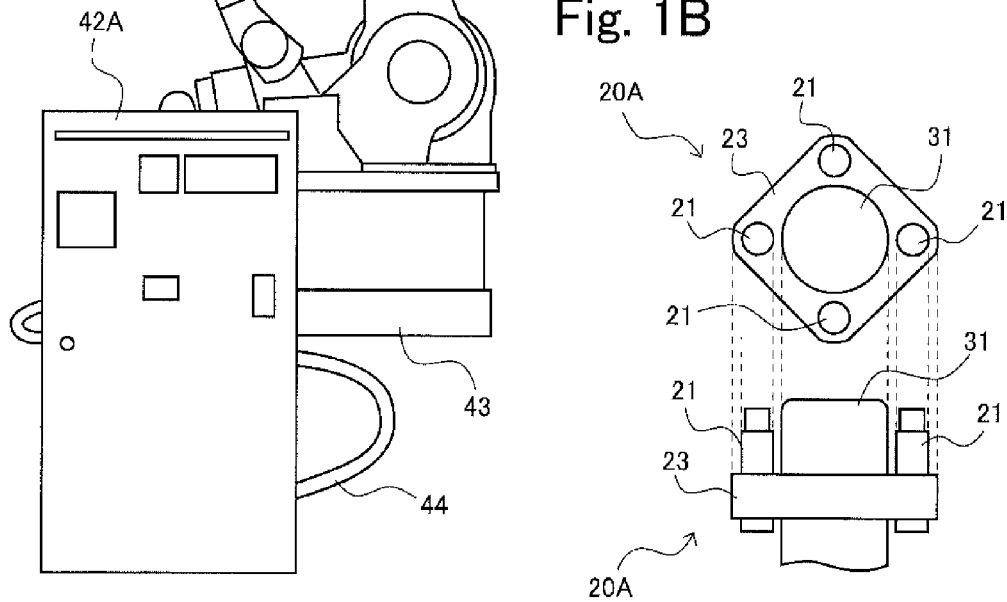
FIG. 1B is a schematic diagram showing the configuration of a perpendicular-to-plane detector included in the friction stir spot welding unit of FIG. 1A.
Figure 2:
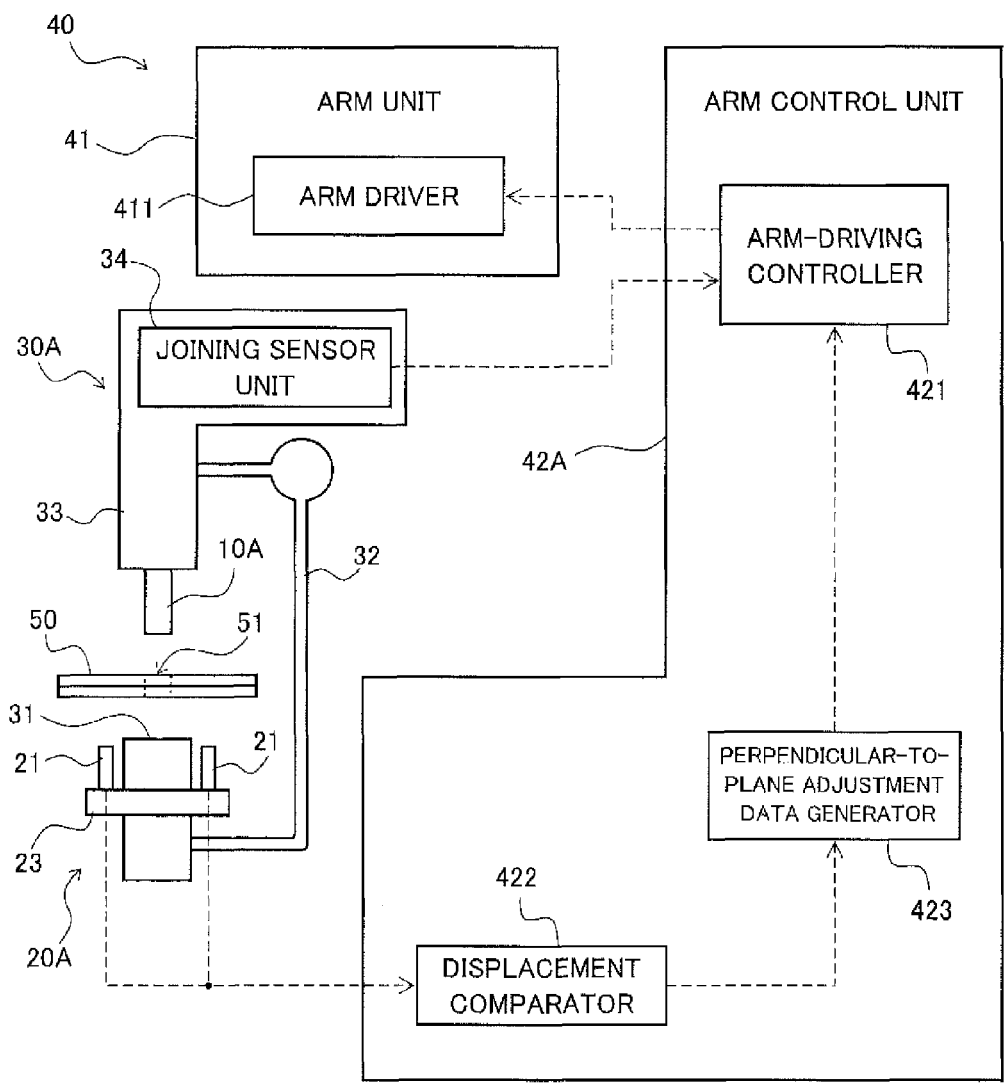
FIG. 2 is a block diagram showing one example of a control configuration of the friction stir spot welding apparatus of FIG. 1A.

As shown in FIG. 1A and FIG. 2, the friction stir spot welding unit 30A includes a rotary tool 10A, a perpendicular-to-plane detector 20A, a backing portion 31, a frame portion 32, a rotary tool driver 33, and a joining sensor unit 34 (shown only in FIG. 2). The frame portion 32 is formed as a C-shaped frame. The rotary tool driver 33 is mounted to the upper part of the frame portion 32, and the backing portion 31 is mounted to the lower part of the frame portion 32. The rotary tool 10A is mounted to the rotary tool driver 33, and is driven by the rotary tool driver 33 to move forward and backward (in directions indicated by a two-directional block arrow Dp in FIG. 1) and to rotate (e.g., in a direction indicated by a block arrow Dr in FIG. 1, or in a direction reverse thereto). The rotary tool 10A and the backing portion 31 are disposed at respective positions facing each other. Specifically, the frame portion 32 fixes the rotary tool driver 33 and the backing portion 31 such that, along the forward and backward movement directions Dp (indicated by the two-directional block arrow in FIG. 1) of the rotary tool 10A, the backing portion 31 is disposed at a position facing the position of the rotary tool 10A. Workpieces 50 are placed between the rotary tool 10A and the backing portion 31 (see FIG. 2).

In the present embodiment, the rotary tool 10A is a pin member having a substantially cylindrical or substantially columnar shape. The rotary tool 10A is configured to be rotatable about a rotational axis relative to the rotary tool driver 33 and be movable forward and backward along the rotational axis. The backing portion 31 is, as previously described, provided at a position facing the position of the rotary tool 10A, i.e., provided at a position in the forward movement direction of the rotary tool 10A. The backing portion 31 includes a contact surface that comes into contact with the back surface of the workpieces 50. In the present embodiment, the backing portion 31 is a columnar stand with a flat top surface. Accordingly, the contact surface is a flat surface. However, the present invention is not thus limited. Alternatively, known various configurations are adoptable, so long as the contact surface can come into contact with the back surface of the workpieces 50.

The rotary tool 10A makes forward movement in a manner to protrude while being rotated by the rotary tool driver 33, thereby coming into contact with the front surface of the workpieces 50 (e.g., metal plates). At the time, the back surface of the workpieces 50 is supported by the backing portion 31. Accordingly, the tip of the rotary tool 10A is pressed against the workpieces 50, and in this state, a contacting portion of the tip, the contacting portion being in contact with the workpieces 50, is rotated. As a result, the workpieces 50 become softened by frictional heat. Consequently, the rotary tool 10A is, while being rotated by the rotary tool driver 33, pushed (press-fitted) into the inside of the front surface of the workpieces 50. Thereafter, the rotary tool driver 33 pulls the rotary tool 10A away (i.e., the rotary tool 10A moves backward). As a result, the softened metal members become hardened and form a joint.

It should be noted that the workpieces 50 are not particularly limited to specific ones, so long as the workpieces 50 are plate-shaped members made of a material that allows the plate-shaped members to be joined together by friction stir spot welding. For example, the workpieces 50 may be flat metal plates as schematically shown in FIG. 2, or may be curved plates that are curved to one side, such as those obtained by dividing a cylinder in its axial direction, or may be curved plates that are curved in a spherical manner.

As previously described, the frame portion 32 is a frame member (a frame) that fixes the rotary tool 10A (as well as the rotary tool driver 33 and so forth) and that fixes the backing portion 31 at the position in the forward movement direction of the rotary tool 10A. In the present embodiment, the frame portion 32 is formed as a C-shaped frame. However, the frame portion 32 may have an alternative known configuration, so long as the frame portion 32 allows the rotary tool 10A and the backing portion 31 to be fixedly disposed such that they face each other. The rotary tool driver 33 is configured by using a motor, a gear mechanism, etc., that are known in the field of friction stir spot welding. The rotary tool driver 33 drives the rotary tool 10A, which is a pin member, to rotate and to move to forward/backward. The specific configuration of the rotary tool driver 33 is not particularly limited, and a well-known configuration in the field of friction stir spot welding can be suitably adopted.

The joining sensor unit 34 includes various sensors, such as a pressure sensor and a stroke sensor. As schematically shown in the block diagram of FIG. 2, the joining sensor unit 34 is included in the friction stir spot welding unit 30A. The joining sensor unit 34 outputs detection or measurement results obtained by the various sensors to an arm-driving controller 421 described below as data for use in control.

The perpendicular-to-plane detector 20A detects that the rotary tool 10A is in such a position (or orientation) that the rotary tool 10A is in the perpendicular-to-plane state relative to a joining target portion of the workpieces 50. In the present embodiment, as shown in FIG. 1A and FIG. 2, the perpendicular-to-plane detector 20A is integrally provided on the backing portion 31. The joining target portion 51 of the workpieces 50 herein is a portion where the workpieces 50 are to be joined together by spot welding by the rotary tool 10A (i.e., a portion indicated by dotted lines in FIG. 2). A plurality of measurement positions described below are set around the joining target portion. In the present embodiment, as shown in FIG. 1B, the perpendicular-to-plane detector 20A includes a total of four position sensors 21 for measuring distances to the measurement positions. These position sensors 21 are arranged at regular intervals around the backing portion 31 by a position sensor fixing member 23.

In the present embodiment, as shown in FIG. 1B, the position sensor fixing member 23 is a square-shaped frame member that is mounted, in a flange-like manner, to the side of the backing portion 31, which is formed as a columnar stand. Each of the position sensors 21 is fixed near a corresponding one of the corners of the square. It should be noted that the specific configurations of the position sensors 21 and the perpendicular-to-plane detector 20A including the position sensors 21 will be described below together with a method of detecting the perpendicular-to-plane state.

In the present embodiment, the robotics device 40 including the friction stir spot welding unit 30A is an articulated robot as schematically shown in FIG. 1A, The robotics device 40 has a known configuration that includes the arm unit 41, an arm control unit 42A, a base portion 43, and so forth. It should be noted that FIG. 1A is merely a schematic diagram, and the arm unit 41, the arm control unit 42A, etc., are shown in the diagram in a manner not corresponding to the actual dimensions for the sake of convenience of the description of the friction stir spot welding unit 30A.

As schematically shown in FIG. 2, the arm unit 41 includes an arm driver 411, for example. The arm driver 411 includes a plurality of drive shafts, for example. As shown in FIG. 1A, the arm unit 41 is a multi-jointed arm mechanism. Accordingly, the arm unit 41 can operate three-dimensionally in the state of being installed at a work site by the base portion 43. The rotary tool 10A (as well as the rotary tool driver 33) and the backing portion 31 are fixed to the frame portion 32 as previously described. Since the frame portion 32 is mounted to the tip of the arm unit 41, the three-dimensional position of the rotary tool 10A can be moved by the three-dimensional operation of the arm unit 41.

The arm control unit 42A controls the operation of the arm unit 41. Particularly in the present embodiment, the arm unit 41 can be controlled based on results of the detection by the perpendicular-to-plane detector 20A in a manner to adjust the position (orientation) of the rotary tool 10A relative to the joining target portion 51. In the present embodiment, the arm control unit 42A is configured as a casing independent of the arm unit 41 as schematically shown in FIG. 1A, and is connected to the arm unit 41 via, for example, a cable 44.

In the present embodiment, the arm control unit 42A includes the arm-driving controller 421, a displacement comparator 422, a perpendicular-to-plane adjustment data generator 423, and so forth. The arm-driving controller 421 generates various command signals based on various data obtained from the joining sensor unit 34 (i.e., based on detection results or measurement results obtained from the various sensors) and "perpendicular-to-plane adjustment data" obtained from the perpendicular-to-plane adjustment data generator 423, and outputs the command signals to the arm driver 411. Accordingly, the operations of, for example, the plurality of drive shafts included in the arm driver 411 are controlled, and thereby the arm unit 41 can smoothly perform various operations.

The displacement comparator 422 and the perpendicular-to-plane adjustment data generator 423 serve as control components of the arm control unit 42A, and also serve as control components of the perpendicular-to-plane detector 20A. Each of the plurality of position sensors 21 included in the perpendicular-to-plane detector 20A measures a space between the position sensor 21 and a measurement position (i.e., a distance from the position sensor 21 to the measurement position) as a displacement, and these displacements are outputted to the displacement comparator 422. As is described below, the displacement comparator 422 compares the plurality of displacements (distances), and outputs the comparison results to the perpendicular-to-plane adjustment data generator 423. By using the comparison results of the displacements (distances), the perpendicular-to-plane adjustment data generator 423 generates "perpendicular-to-plane adjustment data" for use in the control by the arm-driving controller 421, and outputs the "perpendicular-to-plane adjustment data" to the arm-driving controller 421.

It should be noted that when the displacement comparator 422 and the perpendicular-to-plane adjustment data generator 423 are seen as control components of the perpendicular-to-plane detector 20A, the displacement comparator 422 and the perpendicular-to-plane adjustment data generator 423 substantially act as a "perpendicular-to-plane state determiner" that determines whether or not the current state is the perpendicular-to-plane state. The displacement comparator 422 receives the distances to the measurement positions, which the plurality of respective position sensors 21 have measured, as a plurality of displacements, and compares these displacements as to whether or not these displacements are equal to each other. If the perpendicular-to-plane adjustment data generator 423 determines based on the comparison results of the displacements that the current state is the perpendicular-to-plane state, the perpendicular-to-plane adjustment data generator 423 generates no perpendicular-to-plane adjustment data. On the other hand, if the perpendicular-to-plane adjustment data generator 423 determines based on the comparison results of the displacements that the current state is not the perpendicular-to-plane state, the perpendicular-to-plane adjustment data generator 423 generates perpendicular-to-plane adjustment data. Thus, the displacement comparator 422 generates displacement comparison data; the perpendicular-to-plane adjustment data generator 423 determines (detects) based on the displacement comparison data whether or not the current state is the perpendicular-to-plane state; and when the current state is not the perpendicular-to-plane state, the perpendicular-to-plane adjustment data generator 423 generates the "perpendicular-to-plane adjustment data".

In the present embodiment, the arm control unit 42A is configured as the CPU of a microcomputer or of a microcontroller. The CPU operates in accordance with a program stored in a storage unit that is not shown, thereby realizing functions of the arm-driving controller 421, the displacement comparator 422, and the perpendicular-to-plane adjustment data generator 423. It should be noted that the specific configuration of the arm control unit 42A is not thus limited. At least part of the arm control unit 42A may be a logic circuit that is configured by using a known switching element, subtracter, comparator, etc. The control configuration of the arm control unit 42A is also not limited to the example shown in FIG. 2, and various known control configurations are adoptable as the control configuration of the arm control unit 42A.

[Detection of Perpendicular-To-Plane State by Perpendicular-To-Plane Detector]

Next, the detection of the perpendicular-to-plane state by the perpendicular-to-plane detector 20A is specifically described with reference to FIG. 3, FIG. 4A to FIG. 4C, FIG. 5A, and FIG. 5B in addition to FIG. 1A, FIG. 1B, and FIG. 2.

Figure 3:
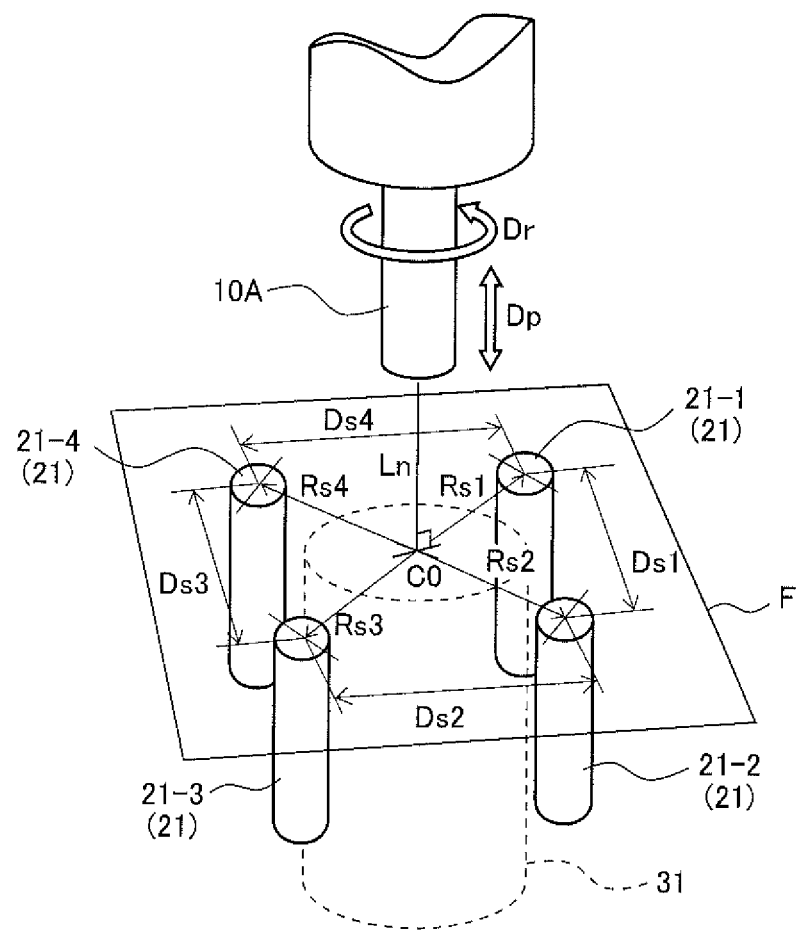
FIG. 3 is a schematic perspective view schematically showing a positional relationship between a rotary tool and four position sensors included in the perpendicular-to-plane detector of the friction stir spot welding apparatus of FIGS. 1A and 2.

As shown in FIG. 1B, the perpendicular-to-plane detector 20A according to the present embodiment includes four position sensors 21. As shown in FIG. 3, these position sensors 21 are arranged such that, on a plane to which the forward and backward movement directions Dp of the rotary tool 10A (indicated by the two-directional block arrow in the diagram) are normal, the position sensors 21 are equally distant from an forward and backward movement path of the rotary tool 10A (i.e., equally distant from a track that would be made when the rotary tool 10A moves forward or backward). It should be noted that the plane to which the forward and backward movement directions Dp of the rotary tool 10A are normal is hereinafter referred to as a "reference plane" for the sake of convenience of the description, FIG. 3 also shows an example of a rotation direction Dr of the rotary tool 10A.

Specifically, as shown in FIG. 3, when a reference plane F, containing measuring portions provided at the tips of the four position sensors 21, is assumed, the direction of a normal line Ln of the reference plane F coincides with the forward and backward movement directions Dp of the rotary tool 10A. Moreover, for example, if the four position sensors 21 are sequentially arranged clockwise from the top right of FIG. 3 as a first position sensor 21-1, a second position sensor 21-2, a third position sensor 21-3, and a fourth position sensor 21-4, and the intersection point of the reference plane F and the forward and backward movement directions Dp (i.e., the direction of the normal line Ln) (i.e., the intersection point of the forward and backward movement path of the rotary tool 10A and the reference plane F) is C0, and the distances between the intersection point C0 and the first to fourth position sensors 21-1 to 21-4 are Rs1, Rs2, Rs3, and Rs4, respectively, then Rs1=Rs2=Rs3=Rs4.

That is, the four position sensors 21 are equally distant from the intersection point C0. In other words, the first to fourth position sensors 21-1 to 21-4 are positioned on the reference plane F and on the circumference of a circle whose center is the intersection point C0.

If the interval between the first position sensor 21-1 and the second position sensor 21-2 is Ds1, the interval between the second position sensor 21-2 and the third position sensor 21-3 is Ds2, the interval between the third position sensor 21-3 and the fourth position sensor 21-4 is Ds3, and the interval between the fourth position sensor 21-4 and the first position sensor 21-1 is Ds4, then Ds1=Ds2=Ds3=Ds4. That is, the intervals between the adjoining position sensors 21 are equal to each other. Accordingly, a quadrangle formed by the four position sensors 21 is a square.

Each position sensor 21 uses the tip (measuring portion) of the position sensor 21 as a reference position, and measures the distance from the reference position to a measurement position set around the joining target portion 51 as a displacement. When an imaginary line extending from the tip of the position sensor 21 to a perpendicular-to-plane detection surface of the workpieces 50 in parallel to the forward and backward movement path (the forward and backward movement directions Dp) of the rotary tool 10A is assumed, the measurement position is set as the intersection point of the imaginary line and the perpendicular-to-plane detection surface. Then, if all the displacements (distances) measured by the plurality of position sensors 21 are equal to each other, the perpendicular-to-plane detector 20A detects that the rotary tool 10A is in the perpendicular-to-plane state relative to the joining target portion 51.

Figure 4A:
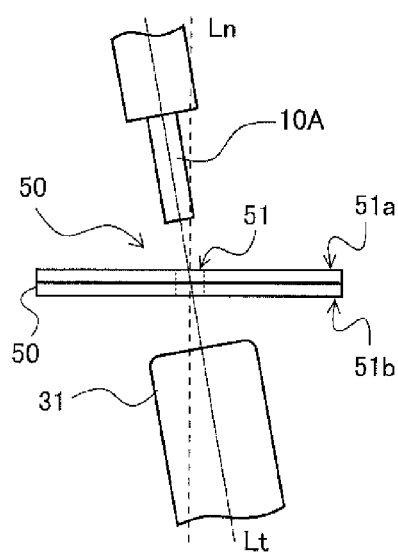
FIG. 4A is a side view showing an essential part of the friction stir spot welding unit and schematically showing the position of the rotary tool not in a perpendicular-to-plane state in the friction stir spot welding apparatus that does not include the perpendicular-to-plane detector.

Specifically, first, it is assumed that, as shown in FIG. 4A, the workpieces 50 are flat plate-shaped and the friction stir spot welding unit 30A does not include the perpendicular-to-plane detector 20A. At a point when the friction stir spot welding unit 30A performs the joining at the measurement positions on the workpieces 50, as shown in FIG. 4A, the rotary tool 10A is facing a front surface 51a of the workpieces 50, and the backing portion 31 is facing a back surface 51b of the workpieces 50. It should be noted that a portion indicated by dotted lines in the diagram is the joining target portion 51. In a case where a straight line Lt connecting the rotary tool 10A and the backing portion 31 (i.e., a straight line corresponding to the forward and backward movement path of the rotary tool 10A) is a tool forward and backward movement line Lt, if the rotary tool 10A is in the perpendicular-to-plane state relative to the flat front surface 51a, then the tool forward and backward movement line Lt coincides with the normal line Ln of the front surface 51a. FIG. 4A shows a state where the tool forward and backward movement line Lt is inclined relative to the normal line Ln. That is, the rotary tool 10A is not in the perpendicular-to-plane state.

Figure 4B:
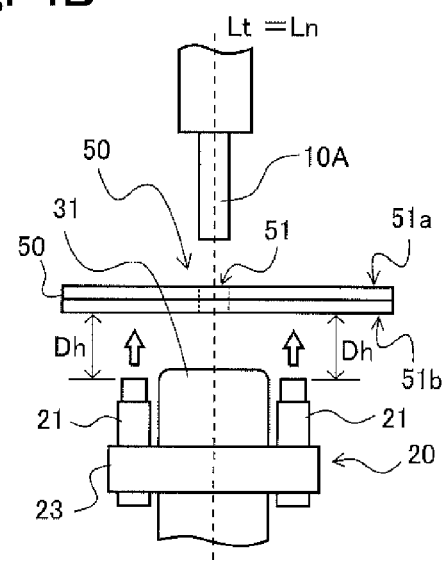
FIG. 4B is a side view showing an essential part of the friction stir spot welding unit and schematically showing the positions of the rotary tool and the perpendicular-to-plane detector when the perpendicular-to-plane state is detected in the friction stir spot welding apparatus of FIGS. 1A and 2.

In this respect, as shown in FIG. 4B, the perpendicular-to-plane detector 20A is integrally provided on the backing portion 31 in the present embodiment. The position sensors 21 of the perpendicular-to-plane detector 20A measure respective distances Dh to the back surface 51b of the workpieces 50 as displacements. Accordingly, the arm control unit 42A compares the four measured distances Dh. If these distances Dh are substantially equal to each other, the perpendicular-to-plane detector 20A is in the perpendicular-to-plane state relative to the back surface 51b of the workpieces 50, and as shown in FIG. 4B, the tool forward and backward movement line Lt coincides with the normal line Ln (FIG. 4B indicates Lt=Ln).

Figure 4C:
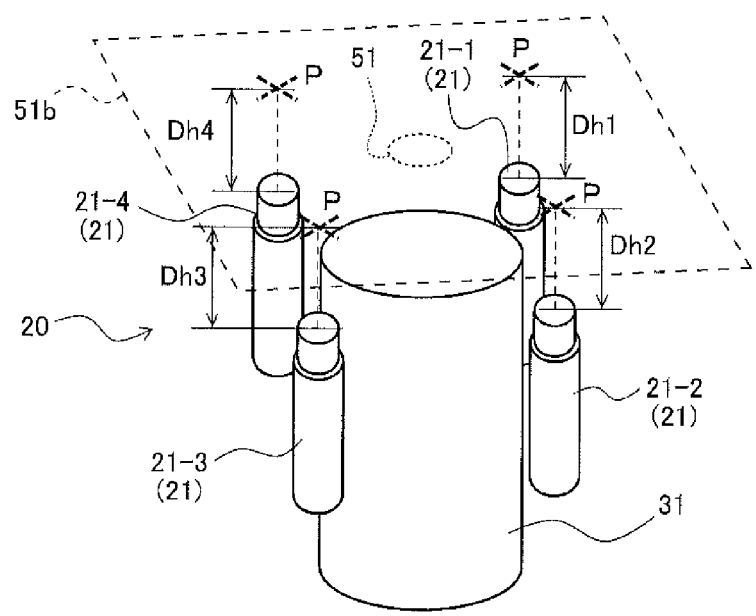
FIG. 4C is a perspective view schematically showing a positional relationship between the back surface of a joining target portion and four position sensors when the perpendicular-to-plane detector is in such a state as shown in FIG. 4B.

For example, it is assumed as shown in FIG. 4C that the joining target portion 51 (indicated by a dotted line in FIG. 4C) is positioned at the center of the back surface 51b (indicated by a dotted line in FIG. 4C) of the workpieces 50, and that four measurement positions P are set around the joining target portion 51. It is also assumed that the distance Dh from the tip of the first position sensor 21-1 (i.e., from the distance measurement reference position) to its corresponding measurement position P is a first measured distance Dh1; the distance Dh from the second position sensor 21-2 to its corresponding measurement position P is a second measured distance Dh2; the distance Dh from the third position sensor 21-3 to its corresponding measurement position P is a third measured distance Dh3; and the distance Dh from the fourth position sensor 21-4 to its corresponding measurement position P is a fourth measured distance Dh4. In this case, if Dh1=Dh2=Dh3=Dh4, the perpendicular-to-plane detector 20A is parallel to the back surface 51b of the workpieces 50. Accordingly, the perpendicular-to-plane detector 20A is in the perpendicular-to-plane state relative to the joining target portion 51.

The perpendicular-to-plane detector 20A is integrally provided on the backing portion 31, and the backing portion 31 is fixed by the frame portion 32 to a position that is on the tool forward and backward movement line Lt as seen from the rotary tool 10A and that faces the position of the rotary tool 10A. Therefore, since the fact that the perpendicular-to-plane detector 20A is in the perpendicular-to-plane state relative to the joining target portion 51 means that the backing portion 31 and the rotary tool 10A are also in the perpendicular-to-plane state relative to the joining target portion 51, the perpendicular-to-plane detector 20A can detect that the rotary tool 10A is in the perpendicular-to-plane state.

It should be noted that the definition of the state where "the distances Dh measured by the position sensors 21 are equal to each other" in the present invention includes not only a case where the numerical values of the distances Dh completely coincide with each other, but also a case where the distances Dh are in a predetermined range that is set in forward (this range is hereinafter referred to as an "equal distance range" for the sake of convenience of the description).

For example, in a case where the precision of the measurement of the distances Dh by the position sensors 21 is high, the distances Dh measured by the respective position sensors 21 may not coincide with each other. Alternatively, depending on the technical field to which the friction stir spot welding is applied, it can be determined that the rotary tool 10A is in the perpendicular-to-plane state even if the measured distances Dh do not completely coincide with each other. Therefore, in the present invention, it may be determined that the measured distances Dh are substantially equal to each other (or substantially coincide with each other) when the measured distances Dh are in the "equal distance range". A specific numerical value range serving as the "equal distance range" can be suitably set in accordance with various conditions, such as the measurement precision of the position sensors 21, the technical field to which the friction stir spot welding is applied, the shape of the workpieces 50, etc. In a case where the measurement positions P are sufficiently close to each other, even if the portion around the joining target portion 51 of the workpieces 50 is formed to have a curved surface, the perpendicular-to-plane state can be detected.

The position sensors 21 used in the perpendicular-to-plane detector 20A are not limited to a particular type of sensors, but those known in the field of distance measurement can be suitably used as the position sensors 21. Typically, for example, eddy current sensors can be used as the position sensors 21. The use of eddy current sensors has a number of advantages including: being capable of measuring the distances in a non-contacting manner; being relatively smaller in size than the other sensors; and allowing components such as the backing portion 31 to be readily mounted to the friction stir spot welding unit 30A.

Other examples of sensors usable as the position sensors 21 include laser sensors and linear variable differential transformers (LVDT). In the case of using laser sensors as the position sensors 21, the distances Dh can be measured in a non-contacting manner with higher precision. In the case of using LVDTs as the position sensors 21, the distances Dh can be measured in a state where the position sensors 21 are in contact with the workpieces 50 (i.e., in a contacting manner).

The number of position sensors 21 included in the perpendicular-to-plane detector 20A is not particularly limited. In the present embodiment, as shown in FIG. 2, FIG. 3, FIG. 4C, and FIG. 5A, the perpendicular-to-plane detector 20A includes four position sensors 21, which for in a square shape. However, it will suffice if the perpendicular-to-plane detector 20A includes at least three position sensors 21, for example, as shown in FIG. 5B. If there are three or more position sensors 21, a plane can be formed (in other words, the position sensors 21 can be disposed on the reference plane F), and accordingly, an equilateral triangle whose center coincides with the forward and backward movement path can be formed. Alternatively, the perpendicular-to-plane detector 20A may include five or more position sensors 21 as necessary. It should be noted that since the number of position sensors 21 is not particularly limited, the number of measurement positions P set on the perpendicular-to-plane detection surface (the back surface 51b) is also not particularly limited.

It is preferable for the perpendicular-to-plane detector 20A to include four position sensors 21 as in the present embodiment rather than including three position sensors 21 as shown in FIG. 5B. Including the four position sensors 21 makes it possible to utilize the results of the detection by the perpendicular-to-plane detector 20A as X-Y axial two-dimensional perpendicular-to-plane adjustment data. Accordingly, the arm control unit 42A can control the operation of the arm unit 41 based on such two-dimensional perpendicular-to-plane adjustment data. In this respect, a specific description is given below with reference to FIG. 6 and FIG. 7.

Figure 6:
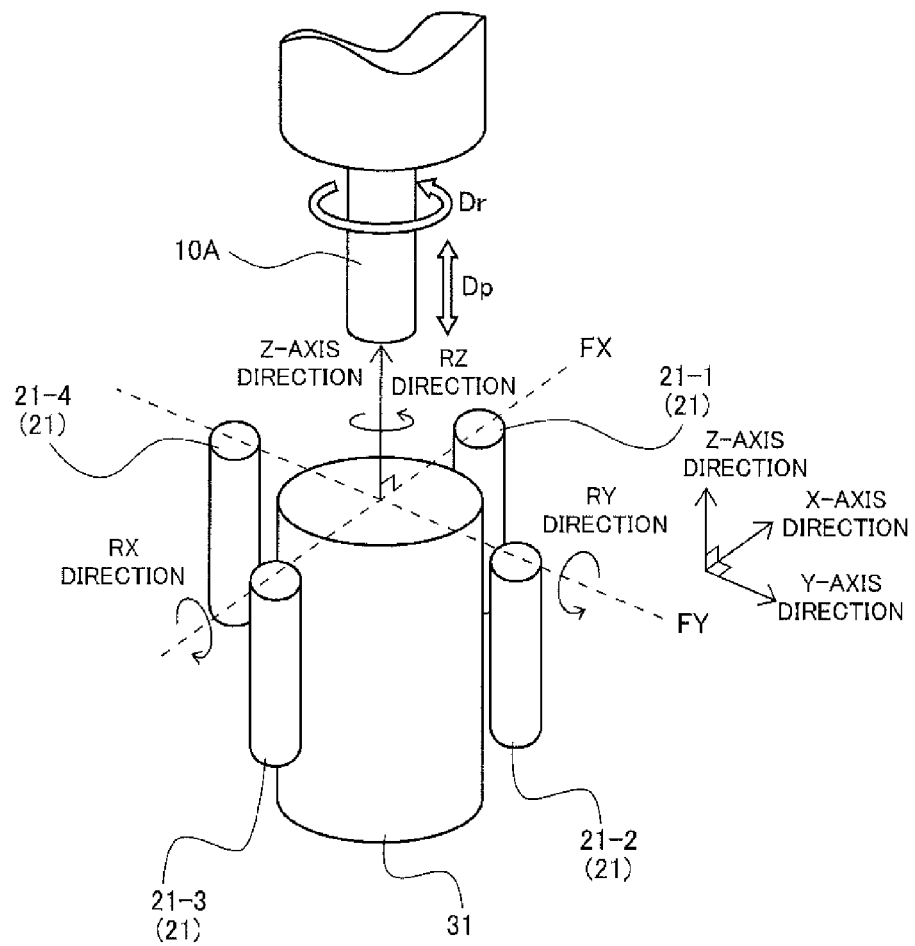
FIG. 6 is a schematic perspective view of the friction stir spot welding unit, showing an X-axis direction, a Y-axis direction, and a Z-axis direction that are set in relation to the perpendicular-to-plane detector of FIG. 5A and showing an RX direction, an RY direction, and an RZ direction that are the directions of rotation about the respective axes.

Firstly, the four position sensors 21 can be divided into two pairs of position sensors 21 such that, in each pair, the position sensors 21 face each other on a diagonal line. In FIG. 6, as one example, the first position sensor 21-1 and the third position sensor 21-3 form a "first pair", and the second position sensor 21-2 and the fourth position sensor 21-4 form a "second pair". The forward and backward movement directions Dp of the rotary tool 10A serve as a Z axis. A line that passes through the first pair of position sensors 21 on the reference plane F (not shown in FIG. 6) is set as a line FX (indicated by a dashed line in FIG. 6), and the direction along the line FX serves as an X-axis direction. A line that passes through the second pair of position sensors 21 on the reference plane F is set as a line FY (indicated by a dashed line in FIG. 6), and the direction along the line FY serves as a Y-axis direction. In this case, as shown in FIG. 6, the X-axis direction, Y-axis direction, and Z-axis direction are in a positional relationship in which they are perpendicular to each other. A rotation direction about the X axis is an RX direction, and a rotation direction about the Y axis is an RY direction.

Figure 7:
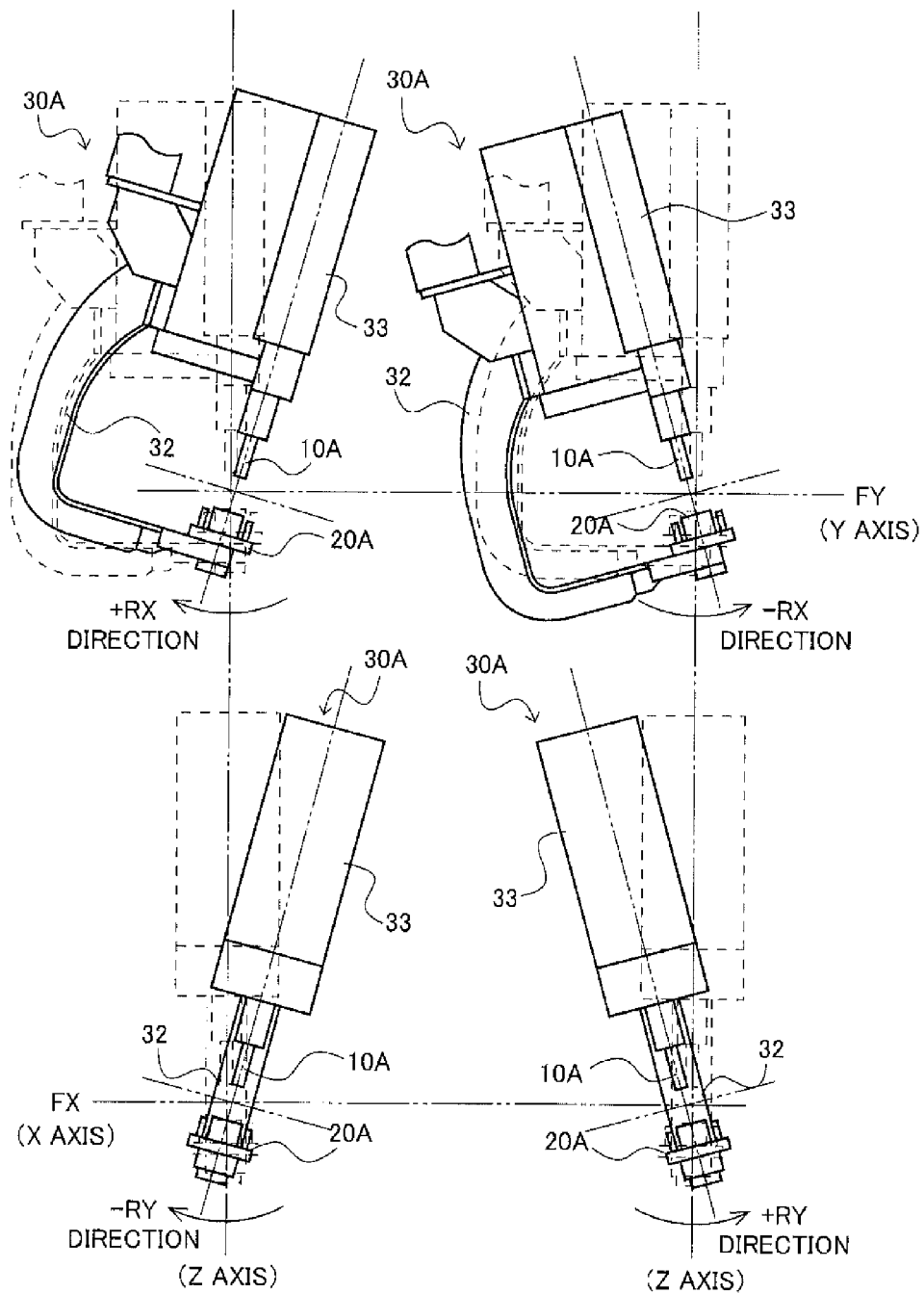
FIG. 7 is a schematic diagram showing positional changes of the friction stir spot welding unit in the RX direction and RY direction of FIG. 6.

To be more specific, for example, if the four position sensors 21 are set such that the position sensors 21 face the front side of the friction stir spot welding unit 30A, then positional changes in the RX direction can be explained as front-rear swinging movement of the friction stir spot welding unit 30A as shown in the upper part of FIG. 7, and positional changes in the RY direction can be explained as right-left swinging movement of the friction stir spot welding unit 30A as shown in the lower part of FIG. 7. In FIG. 7, the friction stir spot welding unit 30A indicated by dashed lines is in such a position that the forward and backward movement directions Dp (Z-axis direction) of the rotary tool 10A coincide with the direction normal to the workpieces 50. For the sake of convenience of the description, this position is hereinafter referred to as a "reference position". It should be noted that FIG. 6 shows an example of the rotation direction Dr of the rotary tool 10A.

The upper left part of FIG. 7 shows a state where the upper part of the friction stir spot welding unit 30A (i.e., the rotary tool driver 33) has moved forward, and the lower part of the friction stir spot welding unit 30A (i.e., the part including the perpendicular-to-plane detector 20A) has moved rearward. The upper right part of FIG. 7 shows a state where the upper part of the friction stir spot welding unit 30A has moved rearward, and the lower part of the friction stir spot welding unit 30A has moved forward. These movements shown in FIG. 7 are positional changes in the RX direction. These positional changes can be detected by, for example, the first pair of position sensors 21 (the first position sensor 21-1 and the third position sensor 21-3). It should be noted that, in the upper part of FIG. 7, the direction along the line FY (the right-left direction in the figure) is the Y-axis direction, and the direction perpendicular thereto (the direction normal to the figure) is the X-axis direction. The upper left part of FIG. 7 shows an example of a positional change in the positive RX direction, and the upper right part of FIG. 7 shows an example of a positional change in the negative RX direction.

The lower left part of FIG. 7 shows a state where the upper part of the friction stir spot welding unit 30A has moved to the right as seen from its front side, and the lower part of the friction stir spot welding unit 30A has moved to the left as seen from its front side. The lower right part of FIG. 7 shows a state where the upper part of the friction stir spot welding unit 30A has moved to the left, and the lower part of the friction stir spot welding unit 30A has moved to the right. These movements shown in FIG. 7 are positional changes in the RY direction. These positional changes can be detected by, for example, the second pair of position sensors 21 (the second position sensor 21-2 and the fourth position sensor 21-4). It should be noted that, in the lower part of FIG. 7, the direction along the line FX (the right-left direction in the figure) is the X-axis direction, and the direction perpendicular thereto (the direction normal to the figure) is the Y-axis direction. The lower left part of FIG. 7 shows an example of a positional change in the negative RY direction, and the upper right part of FIG. 7 shows an example of a positional change in the positive RY direction.

As described above, the perpendicular-to-plane detector 20A can measure the two distances Dh in the RX direction by one of the two pairs of position sensors 21 (the first pair: the first position sensor 21-1 and the third position sensor 21-3), and measure the two distances Dh in the RY direction by the other one of the two pairs of position sensors 21 (the second pair: the second position sensor 21-2 and the fourth position sensor 21-4). Accordingly, the displacement comparator 422 can not only compare the distances Dh measured by the four position sensors 21, but also compare the distances Dh in the RX direction and compare the distances Dh in the RY direction.

Thus, by comparing the distances Dh in the RX direction, a positional change of the target object relative to the Y-axis direction of the reference plane F (i.e., an inclination of the target object relative to the Y-axis direction) can be detected. Similarly, by comparing the distances Dh in the RY direction, a positional change of the target object relative to the X-axis direction of the reference plane F (i.e., an inclination of the target object relative to the X-axis direction) can be detected. Therefore, by using the results of the comparison by the displacement comparator 422, the perpendicular-to-plane adjustment data generator 423 can generate perpendicular-to-plane adjustment data regarding the X-axis direction and perpendicular-to-plane adjustment data regarding the Y-axis direction.

Accordingly, the arm control unit 42A can realize the perpendicular-to-plane state of the rotary tool 10A (the friction stir spot welding unit 30A) by operating the arm unit 41 based on the X-Y axial two-dimensional perpendicular-to-plane adjustment data. Since the detection of the perpendicular-to-plane state requires measurement results obtained from at least three position sensors 21, the remaining one position sensor 21 contributes to redundancy in the detection of the perpendicular-to-plane state. This makes it possible to improve the reliability of the detection of the perpendicular-to-plane state.

Figure 5A:
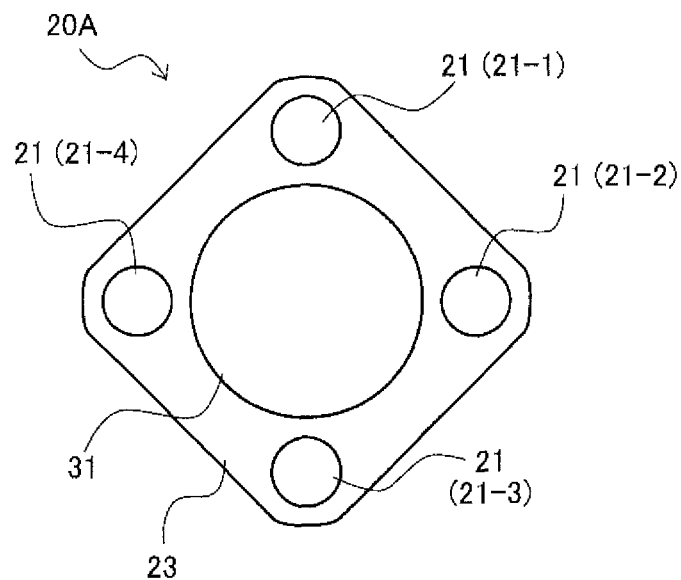
FIG. 5A is a plan view showing the configuration of the perpendicular-to-plane detector of FIGS. 4B and 4C seen from above.
Figure 5B:
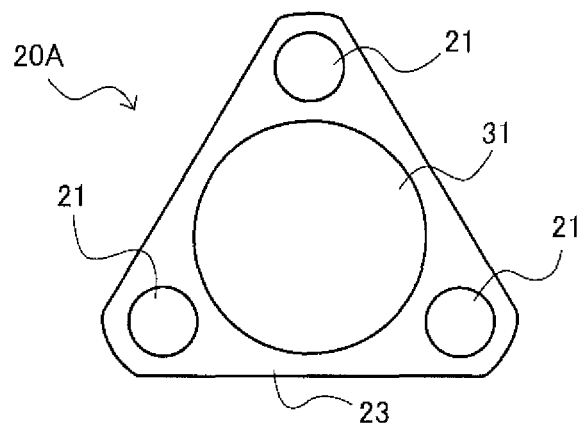
FIG. 5B is a plan view showing a variation of the perpendicular-to-plane detector.

It should be noted that the plurality of position sensors 21 included in the perpendicular-to-plane detector 20A need not form a regular polygon as illustratively shown in FIG. 5A and FIG. 5B. It will suffice if the plurality of position sensors 21 are arranged in a manner to form at least a polygon on the reference plane F. For example, in a case where the perpendicular-to-plane detection surface of the workpieces 50 (in the present embodiment, the back surface 51b) is a curved surface, in order to obtain favorable precision in the detection of the perpendicular-to-plane state, it is preferable that the plurality of position sensors 21 be disposed at positions that are equally distant from the center of the forward and backward movement path of the rotary tool 10A, such that the position sensors 21 form a regular polygon. On the other hand, it is not essential for the plurality of position sensors 21 to form a regular polygon whose center coincides with the forward and backward movement path if the perpendicular-to-plane detection surface is a flat surface.

In the present invention, the specific configuration of the position sensors of the perpendicular-to-plane detector 20A is not particularly limited, so long as the perpendicular-to-plane detector 20A includes the position sensors that are disposed on the reference plane F, to which the forward and backward movement directions of the rotary tool 10A are normal, and that measure distances to at least three measurement positions set around the joining target portion 51. Accordingly, the configuration of the perpendicular-to-plane detector 20A is not limited to the configuration in which each of the position sensors 21 is used as single distance measuring means as illustratively shown in FIG. 5A and FIG. 5B. Alternatively, for example, the perpendicular-to-plane detector 20A may include one position sensor that is provided with three or more distance measuring means. Moreover, in a case where the perpendicular-to-plane detector 20A includes four distance measuring means, the perpendicular-to-plane detector 20A may include two position sensors each provided with two distance measuring means.

In this case, the distance measuring means are required to form a polygon (preferably a regular polygon) on the reference plane F.

[Detection of Perpendicular-To-Plane State and Positional Adjustment of Rotary Tool]

In the present embodiment, whether or not the rotary tool 10A is in the perpendicular-to-plane state can be detected by the perpendicular-to-plane detector 20A. If the rotary tool 10A is not in the perpendicular-to-plane state, the position of the rotary tool 10A can be adjusted by controlling the operation of the arm unit 41 until the rotary tool 10A becomes the perpendicular-to-plane state. Such detection of the perpendicular-to-plane state and adjustment of the position of the rotary tool 10A are specifically described below with reference to FIG. 2 and FIG. 8.

Figure 8:
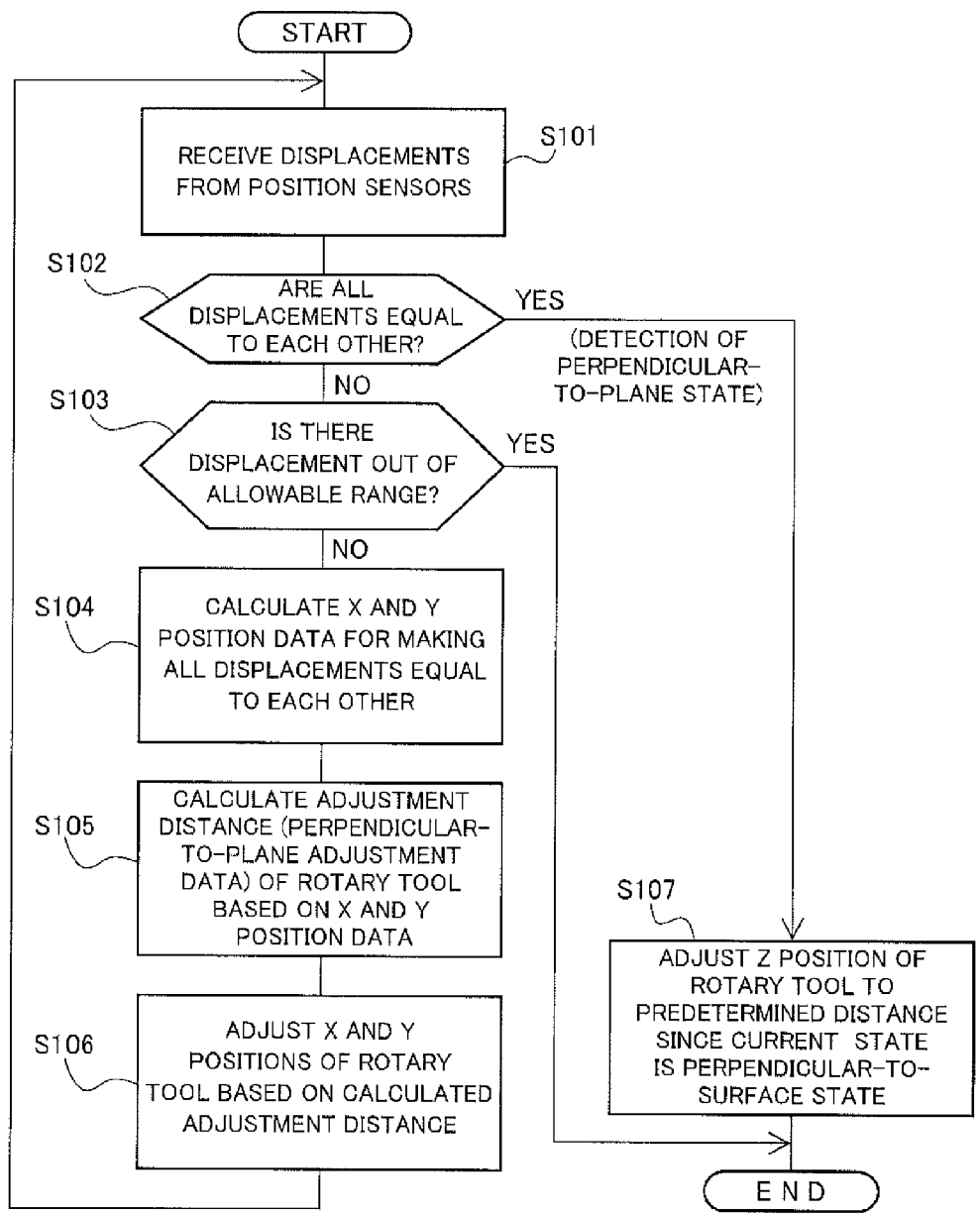
FIG. 8 is a flowchart showing one example of detection control of the perpendicular-to-plane state by the perpendicular-to-plane detector of FIGS. 4B and 4C.

When a series of control is started by the arm control unit 42A, each of the position sensors 21 of the perpendicular-to-plane detector 20A starts measurement, and as shown in FIG. 8, measured displacements (i.e., measurement results of distances Dh) are received by the displacement comparator 422 (step S101). The displacement comparator 422 determines whether or not all the received displacements are equal to each other (step S102). In the present embodiment, the perpendicular-to-plane detector 20A includes the four position sensors 21. Accordingly, four displacements (the first measured distance Dh1 to the fourth measured distance Dh4) are compared with each other, and it is determined whether or not the four displacements substantially coincide with each other (i.e., whether or not the four displacements fall within the "equal distance range").

If all the displacements are not equal to each other (NO in step S102), then the displacement comparator 422 determines whether or not, among the plurality of displacements, there is a displacement that is out of a predetermined allowable range (step S103). The allowable range herein means a range that excludes a case where the perpendicular-to-plane detector 20A is significantly away from the perpendicular-to-plane detection surface and a case where the perpendicular-to-plane detector 20A is excessively close to the perpendicular-to-plane detection surface, i.e., a range within which the perpendicular-to-plane detector 20A is away from the perpendicular-to-plane detection surface with a suitable space formed therebetween.

In a case where the perpendicular-to-plane detector 20A is significantly away from the perpendicular-to-plane detection surface, the distance therebetween exceeds the distance measurement range of the position sensors 21, which makes proper measurement impossible. On the other hand, in a case where the perpendicular-to-plane detector 20A is excessively close to the perpendicular-to-plane detection surface, there is the following risk: when an adjustment operation for realizing the perpendicular-to-plane state is performed, the perpendicular-to-plane detector 20A or the backing portion 31 comes into contact or collides with the back surface 51b (the perpendicular-to-plane detection surface) of the workpieces 50, or the rotary tool 10A comes into contact or collides with the front surface 51a of the workpieces 50.

If there is a displacement that is out of the allowable range (YES in step S103), the arm control unit 42A ends the series of automatic adjustment control, and the space between the perpendicular-to-plane detector 20A and the measurement positions P is manually adjusted to be in a suitable range. Then, the automatic adjustment control is performed again. On the other hand, if there is no displacement that is out of the allowable range (NO in step S103), the displacement comparator 422 outputs the comparison results of the displacements to the perpendicular-to-plane adjustment data generator 423, and the perpendicular-to-plane adjustment data generator 423 calculates position data for making all the displacements equal to each other (step S104).

In the present embodiment, the perpendicular-to-plane detector 20A includes the four position sensors 21, and as shown in FIG. 6 and FIG. 7, the distances Dh in the RX direction and the distances Dh in the RY direction can be measured. Therefore, from the four displacements, the perpendicular-to-plane adjustment data generator 423 calculates position data for the X-axis direction (X position data) and position data for the Y-axis direction (Y position data).

Next, the perpendicular-to-plane adjustment data generator 423 adjusts a control gain. That is, the perpendicular-to-plane adjustment data generator 423 calculates an adjustment distance of the rotary tool 10A based on the X position data and the Y position data (step S105). The adjustment distance is the perpendicular-to-plane adjustment data. The numerical value of the adjustment distance herein may be a value that allows the four displacements to become equal to each other, or may be several tens of percent of, or a fraction of, the value that allows the four displacements to become equal to each other. That is, the perpendicular-to-plane adjustment data generator 423 may be configured to calculate a distance value that is less than a distance value that allows the perpendicular-to-plane state to be realized by performing the adjustment only once.

When such a smaller adjustment distance is calculated, the arm control unit 42A repeats the operation of the arm unit 41 a plurality of times for adjusting the position of the rotary tool 10A. Here, by taking account of various conditions, such as the inertial force exerted from when the arm unit 41 moves until when the arm unit 41 stops and the backlash of the drive shafts or drive mechanism included in the arm unit 41, the perpendicular-to-plane state of the rotary tool 10A can be realized more easily through a plurality of times of fine adjustments. In particular, in a case where high precision of the perpendicular-to-plane state is required, it is preferred to calculate the adjustment distance that is half or less, for example, ⅓ or ¼, of the value.

The perpendicular-to-plane adjustment data generator 423 outputs the generated adjustment distance (perpendicular-to-plane adjustment data) to the arm-driving controller 421. In response, the arm-driving controller 421 operates the arm unit 41 based on the adjustment distance (additionally, for example, measurement results obtained from the joining sensor unit 34 may be used as necessary) to adjust the position of the rotary tool 10A in the X-axis direction (X position) and the position of the rotary tool 10A in the Y-axis direction (Y position) (step S106).

Thereafter, the arm control unit 42A repeats the series of control (the control from step S101 to step S106) until all the displacements obtained from the position sensors 21 become equal to each other. Then, if it is determined that all the displacements are equal to each other (YES in step S102), it means that the perpendicular-to-plane detector 20A has detected the perpendicular-to-plane state. In this state, the X position and the Y position of the rotary tool 10A have already been set such that the perpendicular-to-plane state is realized. Accordingly, the arm control unit 42A adjusts the position of the rotary tool 10A in the Z-axis direction (Z position) to a predetermined value (step S107). For example, the arm control unit 42A may operate the arm unit 41 to adjust the Z position such that the distances between the rotary tool 10A and the measurement positions P become distances that are set in advance. When the adjustment of the Z position is completed, the series of control is ended.

It should be noted that, as previously described, by repeating the series of control, the position of the rotary tool 10A is converged to realize the perpendicular-to-plane state. Here, at the time of determining whether or not the displacements are equal to each other (step S102), it is preferred to also determine how many times the series of control (steps S101 to S106) has been repeated.

When the adjustment to realize the perpendicular-to-plane state has progressed into a stage that requires higher precision, the greater the size of the arm unit 41, the higher the possibility that the position of the rotary tool 10A moves around a convergence point (i.e., a position where the perpendicular-to-plane state is realized) and is not fixed. Therefore, by determining how many times the control has been repeated in addition to determining the displacements, a risk that the converging operation falls into an infinite loop or a time taken for the converging operation becomes excessively long can be avoided. The upper limit of the number of repetitions of the control is not particularly limited, but may be suitably set in accordance with various conditions.

As described above in the present embodiment, in friction stir spot welding, at least three position sensors 21, which measure the distances to the measurement positions P of the workpieces 50, are disposed on the reference plane F, to which the forward and backward movement directions Dp of the rotary tool 10A are normal, such that the position sensors 21 are equally spaced apart from each other and the forward and backward movement path of the rotary tool 10A is positioned at the center among the position sensors 21, and when all the distances measured by the respective position sensors 21 are equal to each other, it is detected that the rotary tool 10A is positioned to be in the perpendicular-to-plane state relative to the joining target portion 51. In this manner, the perpendicular-to-plane state can be readily detected with a simple configuration. This makes it possible to improve the work efficiency and quality of the friction stir spot welding.

Further, in the present embodiment, in order to detect the perpendicular-to-plane state, the arm control unit 42A controls the operation of the arm unit 41 such that all the distances measured by the plurality of respective position sensors 21 become equal to each other, thereby adjusting the position of the rotary tool 10A. When the perpendicular-to-plane state is detected, it means that the positional relationship between the rotary tool 10A and the joining target portion 51 has been suitably set. Therefore, by controlling the arm unit 41 such that the perpendicular-to-plane state is detected by the perpendicular-to-plane detector 20A, the perpendicular-to-plane state of the rotary tool 10A can be automatically set. In addition, immediately after the perpendicular-to-plane state is set, the joining of the workpieces 50 can be performed by the rotary tool 10A. In this manner, the setting of the perpendicular-to-plane state and the friction stir spot welding can be performed continuously. This makes it possible to improve the joining quality and the efficiency of the joining work.

For example, in general, when teaching of the robotics device 40 is performed in friction stir spot welding in the field of aircrafts, it is possible that realizing the perpendicular-to-plane state relative to one joining target portion 51 of the workpieces 50 takes 30 minutes or longer. However, by adopting the present invention, the perpendicular-to-plane state can be realized in less than, for example, one minute. In addition, since the perpendicular-to-plane detector 20A is integrated with the backing portion 31, it is not necessary to perform teaching separately from the friction stir spot welding, and the friction stir spot welding can be performed immediately after the perpendicular-to-plane state is realized. Therefore, the productivity of aircraft parts can be improved significantly, and also, since the joining is performed with the perpendicular-to-plane state realized at high precision, the quality of the aircraft parts can also be improved.

Although the foregoing description has described a case where the rotary tool 10A is caused to be in the perpendicular-to-plane state before the joining of the workpieces 50 is performed, the present invention is not thus limited. For example, the present invention can also be suitably applied to a case where the perpendicular-to-plane state of the rotary tool 10A is kept while the joining of the workpieces 50 is being performed. In this case, the arm control unit 42A may control the arm unit 41 to keep the perpendicular-to-plane state by correcting positional shifts that occur between the rotary tool 10A and the workpieces 50 during the joining work.

Accordingly, a friction stir spot welding method according to the present invention may be configured to: detect, before or while joining is being performed at the joining target portion 51 by the rotary tool 10A, whether or not the rotary tool 10A is positioned to be in the perpendicular-to-plane state relative to the joining target portion 51 of the workpieces 50 when all the distances measured by the respective position sensors 21 are equal to each other; and when it is detected that the rotary tool 10A is in the perpendicular-to-plane state, perform the joining at the joining target portion 51 by the rotary tool 10A.

Embodiment 2

In Embodiment 1, fine adjustments in relation to the X-axis direction and the Y-axis direction as shown in FIG. 6 and FIG. 7 are performed in order to set the perpendicular-to-plane state of the rotary tool 10A. Embodiment 2 adopts a configuration in which the perpendicular-to-plane detector is provided with a contact sensor for additionally performing fine adjustment in relation to the Z-axis direction. This configuration is specifically described below with reference to FIG. 9A to FIG. 9C and FIG. 10.

As shown in FIG. 9A to FIG. 9C and FIG. 10, the fundamental configuration of the friction stir spot welding apparatus according to Embodiment 2 is the same as that of the friction stir spot welding apparatus according to Embodiment 1. However, unlike the perpendicular-to-plane detector 20A of Embodiment 1, a perpendicular-to-plane detector 20B of Embodiment 2 is not integrally provided on the backing portion 31 of a friction stir spot welding unit 30B, but the perpendicular-to-plane detector 20B is provided on the backing portion 31 in a replaceable manner.

Figure 9A:
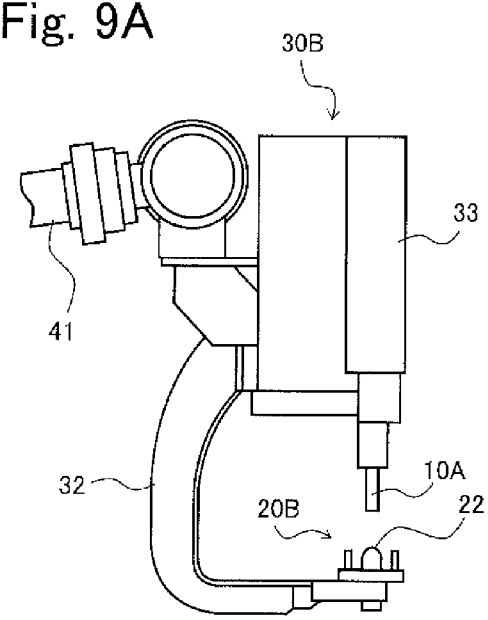
FIG. 9A is a schematic diagram showing one example of a friction stir spot welding apparatus according to Embodiment 2 of the present invention and showing a perpendicular-to-plane detector that is replaceable with a backing portion of a friction stir spot welding unit.
Figure 9B:
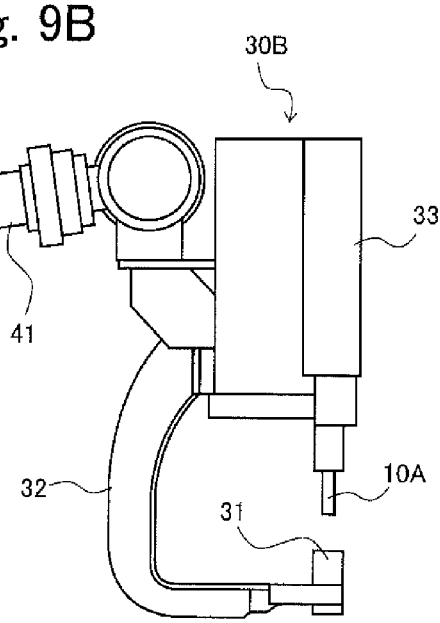
FIG. 9B is a schematic diagram showing a state where the perpendicular-to-plane detector is replaced with the backing portion.
Figure 9C:
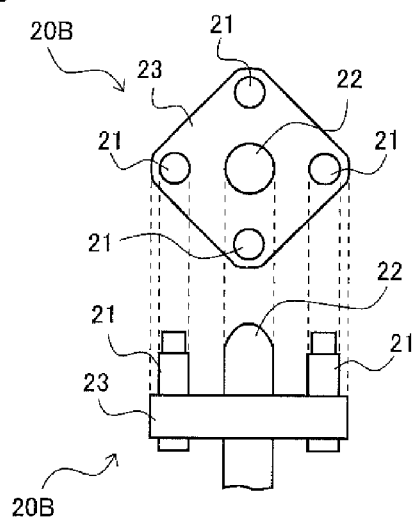
FIG. 9C is a schematic diagram showing the configuration of the perpendicular-to-plane detector of FIG. 9A.

As shown in FIG. 9C, the perpendicular-to-plane detector 20B includes four position sensors 21 near the respective corners of the square position sensor fixing member 23 similar to the perpendicular-to-plane detector 20A of Embodiment 1. However, the perpendicular-to-plane detector 20B is different from the perpendicular-to-plane detector 20A in that the perpendicular-to-plane detector 20B includes a contact sensor 22, which is provided at a position corresponding to the position of the backing portion 31 of the perpendicular-to-plane detector 20A.

The contact sensor 22 is a sensor detecting that the perpendicular-to-plane detector 20B has come into contact with the back surface 51b (the perpendicular-to-plane detection surface) of the workpieces 50. In the present embodiment, for example, a touch sensor of a contact energization type is used as the contact sensor 22. Of course, the specific configuration of the contact sensor 22 is not limited to a contact energization type, but a different known configuration can be suitably adopted.

Figure 10:
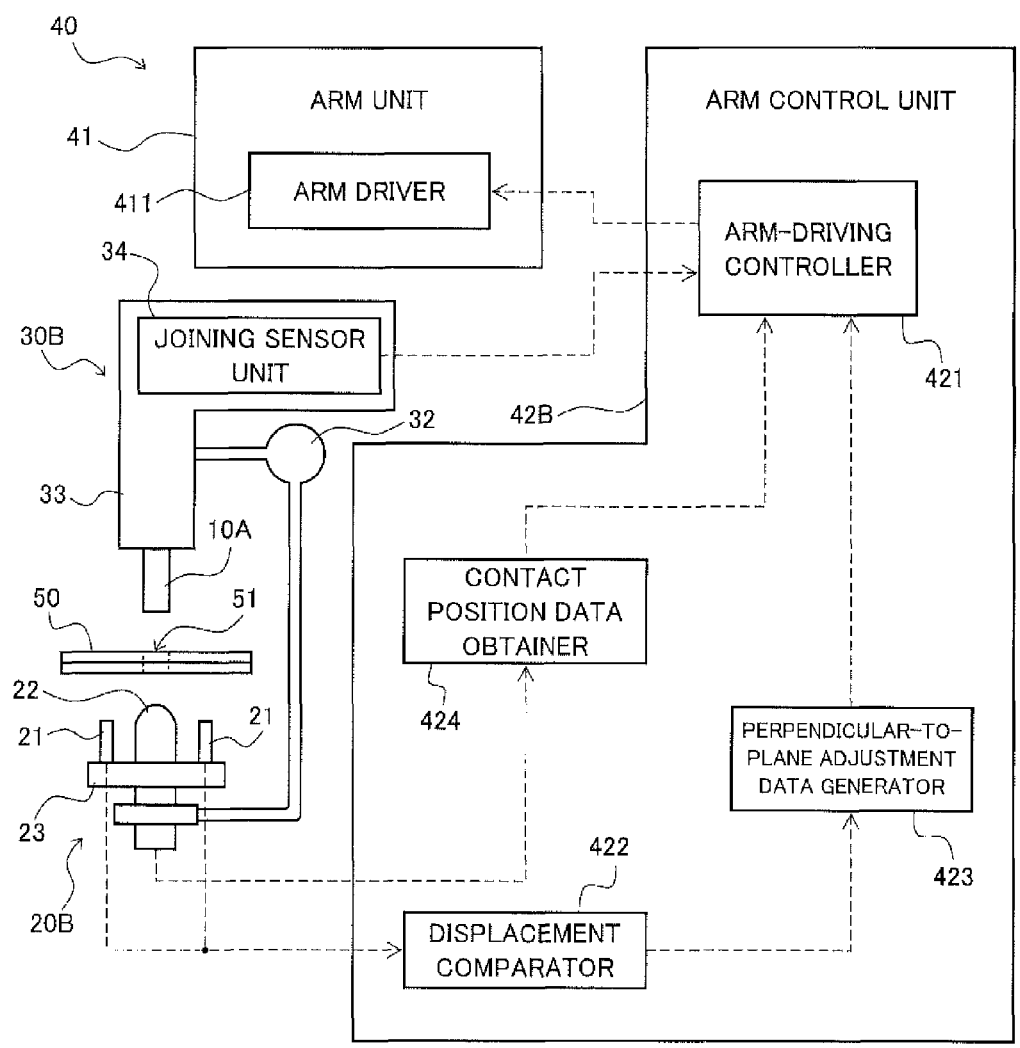
FIG. 10 is a block diagram showing one example of a control configuration of the friction stir spot welding apparatus of FIG. 9.

As shown in FIG. 10, the fundamental configuration of an arm control unit 42B of Embodiment 2 is the same as that of the arm control unit 42A of Embodiment 1. However, the arm control unit 42B is different from the arm control unit 42A in that the arm control unit 42B includes a contact position data obtainer 424. When the contact sensor 22 has detected a contact with the back surface 51b, the contact position data obtainer 424 obtains position data regarding the Z-axis direction of the rotary tool 10A (Z position data, see FIG. 6), and outputs the Z position data to the arm-driving controller 421.

Next, detection of the perpendicular-to-plane state and adjustment of the position of the rotary tool 10A by the perpendicular-to-plane detector 20B and the arm control unit 42B with the above-described configurations are specifically described with reference to FIG. 9A to FIG. 9C, FIG. 10, and FIG. 11.

In the present embodiment, the perpendicular-to-plane detector 20B includes the contact sensor 22 in place of the backing portion 31 (i.e., the perpendicular-to-plane detector 20B is not integrated with the backing portion 31). Accordingly, as shown in FIG. 9A, the perpendicular-to-plane detector 20B is mounted to the lower end of the frame portion 32 of the friction stir spot welding unit 30B, and teaching of the robotics device 40 is performed. Then, the perpendicular-to-plane detector 20B is removed and replaced with the backing portion 31. Thereafter, friction stir spot welding is performed.

Figure 11:
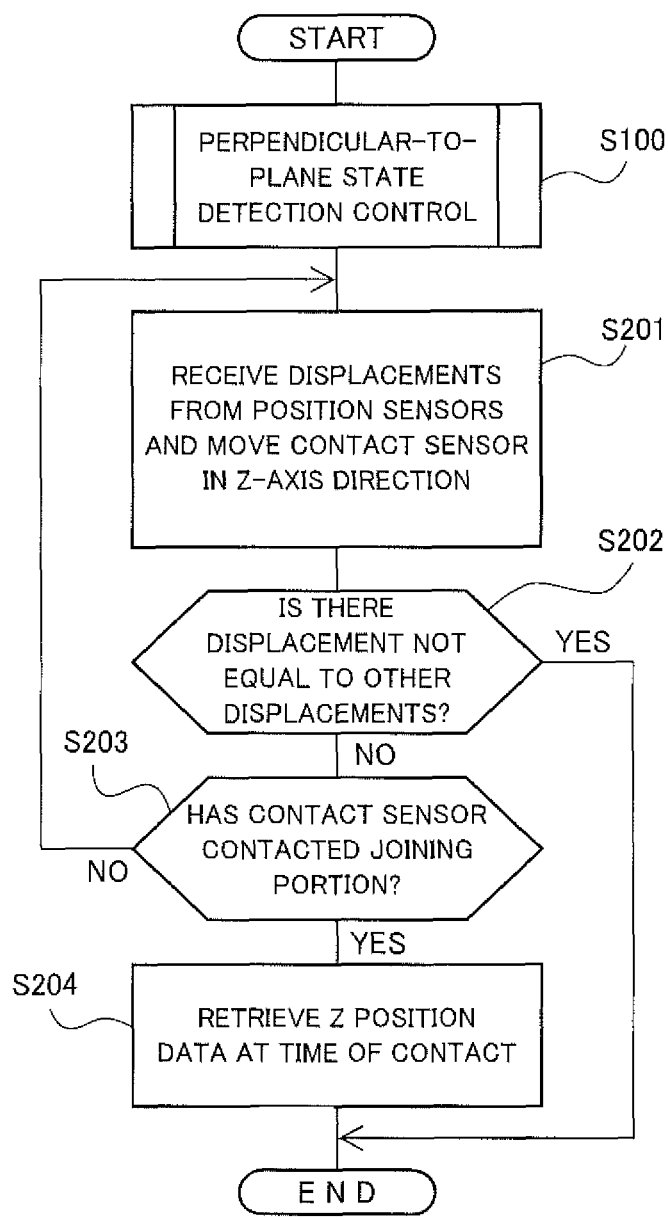
FIG. 11 is a flowchart showing one example of detection control of the perpendicular-to-plane state by the perpendicular-to-plane detector included in the friction stir spot welding apparatus of FIG. 9A to FIG. 9C and FIG. 10.

When a series of control is started by the arm control unit 42B, as shown in FIG. 11, first, the perpendicular-to-plane state detection control previously described in Embodiment 1 and shown in FIG. 8 is performed (step S100). In the final step of the perpendicular-to-plane state detection control, the Z position is adjusted such that the distances between the rotary tool 10A and the measurement positions P become distances that are set in advance.

Next, each of the position sensors 21 of the perpendicular-to-plane detector 20B starts measurement, and as shown in FIG. 10, measured displacements (i.e., measurement results of distances Dh) are received by the displacement comparator 422. At the same time as the measured displacements are received by the displacement comparator 422, the arm-driving controller 421 controls the arm driver 411 to move the contact sensor 22 in the Z direction (step S201). Here, it is determined whether or not, among the displacements received from the position sensors 21, there is a displacement that is not equal to the other displacements, i.e., it is determined whether or not the rotary tool 10A is positioned to be out of the perpendicular-to-plane state (step S202).

If there is a displacement that is not equal to the other displacements (YES in step S202), it means that the rotary tool 10A is positioned to be out of the perpendicular-to-plane state. Therefore, the series of control is ended in order to perform the perpendicular-to-plane state detection control again (step S100, the flowchart shown in FIG. 8). On the other hand, if all the displacements are kept equal to each other (NO in step S202), it is determined whether or not the contact sensor 22 has come into contact with the back surface 51b of the workpieces 50 (i.e., whether or not the contact has been detected) (step S203).

If the contact has not been detected (NO in step S203), the flow returns to the step of moving the contact sensor 22 in the Z direction (step S201). Then, the arm-driving controller 421, while controlling the arm driver 411 to slightly move the contact sensor 22 in the Z direction, updates the displacements that are received from the position sensors 21, and repeats the determination of the displacements and the determination of the contact detection (steps S202 and S203). If the contact by the contact sensor 22 is detected (YES in step S203), the contact sensor 22 outputs a contact detection signal to the contact position data obtainer 424. In response, the contact position data obtainer 424 retrieves the Z position data of the rotary tool 10A at the time of the contact, and outputs the Z position data to the arm-driving controller 421 (step S204). The perpendicular-to-plane state detection control at the time of teaching is ended when the Z position data is retrieved.

Thereafter, as shown in FIG. 9B, the perpendicular-to-plane detector 20B is removed from the frame portion 32, and instead, the backing portion 31 is mounted to the frame portion 32. Then, a friction stir spot welding operation is performed. At the time, the perpendicular-to-plane state of the rotary tool 10A is realized in a state where the backing portion 31 is in contact with the back surface 51b of the workpieces 50. Therefore, when a rotary tool controller that is not shown performs an operation of joining the workpieces 50 together by the rotary tool 10A, improved joining efficiency and joining quality can be obtained.

As described above, in the present embodiment, the perpendicular-to-plane state of the rotary tool 10A is set based on the results of the detection by the perpendicular-to-plane detector 20B and the control by the arm control unit 42B, and in addition, the contact position where the backing portion 31 contacts the back surface 51b of the workpieces 50 can be adjusted. Therefore, for example, when teaching of the robotics device 40 is performed, by merely replacing the backing portion 31 with the perpendicular-to-plane detector 20B, the rotary tool 10A can be automatically set in the perpendicular-to-plane state, and also, a state where the backing portion 31 is gently in contact with the workpieces 50 can be set. As a result, two preparation states, i.e., the perpendicular-to-plane state of the rotary tool 10A and the contacting state of the backing portion 31, can be readily and simply realized while effectively suppressing the risk of the backing portion 31 colliding with the workpieces 50.

Although the perpendicular-to-plane detector 20B is configured as a separate body from the backing portion 31 in the present embodiment, the present invention is not thus limited. For example, as in a friction stir spot welding unit 30C shown in FIG. 12, a perpendicular-to-plane detector 20C may include a contact sensor 35, which doubles as backing. The specific configuration of the contact sensor 35, which doubles as backing, is not particularly limited. For example, a known configuration capable of applying an electric current for use in contact detection to a metal backing portion may be adopted.

In such a configuration, since the backing portion 31 doubles as the contact sensor 22, it is not necessary to replace the perpendicular-to-plane detector 20B with the backing portion 31 after teaching. Therefore, immediately after the perpendicular-to-plane state is set by the contact sensor 35, which doubles as backing, the friction stir spot welding unit 30C can move on to friction stir spot welding.

Embodiment 3

Figure 13:
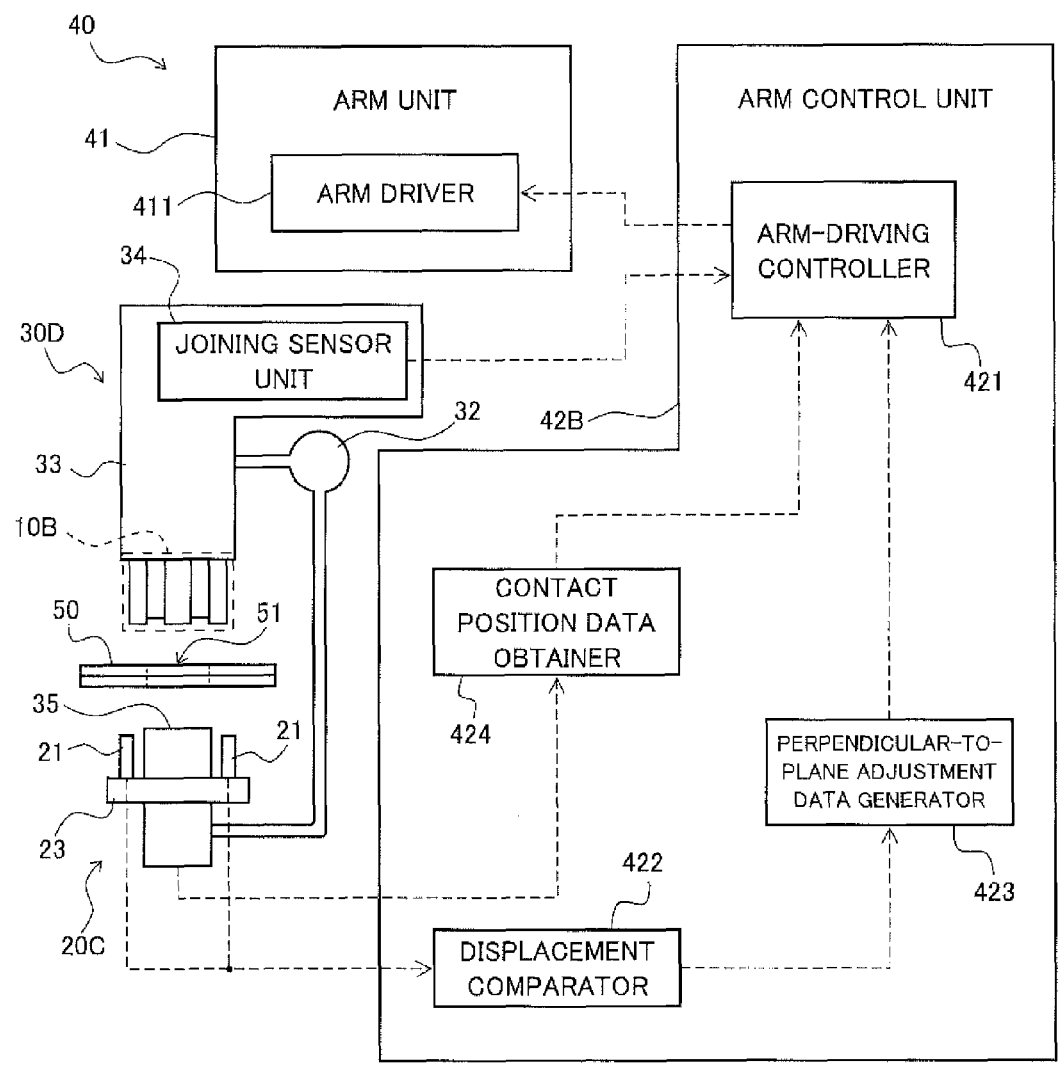
FIG. 13 is a block diagram showing one example of the configuration of a friction stir spot welding apparatus according to Embodiment 3 of the present invention.

Each of the friction stir spot welding apparatuses according to Embodiments 1 and 2 includes the single-acting friction stir spot welding unit 30A, 30B, or 30C, in each of which the rotary tool 10A is formed solely as a pin member. However, the present invention is not thus limited. As shown in FIG. 13, the friction stir spot welding apparatus may include a friction stir spot welding unit 30D including a double-acting rotary tool 10B.

The double-acting rotary tool 10B includes a substantially cylindrical shoulder member with a hollow center and a pin member inserted in the hollow center of the shoulder member although such a configuration is not shown in detail in FIG. 13. The shoulder member is configured to be rotatable about the same rotational axis as that of the pin member and be movable forward and backward along the rotational axis in a manner similar to the pin member.

The rotary tool 10B may further include a clamp member that is provided outside the shoulder member and that presses on the workpieces 50. The clamp member is provided outside the shoulder member and is a cylindrical member with a hollow center similar to the shoulder member. That is, the shoulder member is inserted in the hollow center of the clamp member. As described above, in the friction stir spot welding apparatus according to the present invention, the rotary tool may be a single-acting one as in Embodiment 1 or 2, or may be a double-acting one as in the present embodiment.

Figure 12:
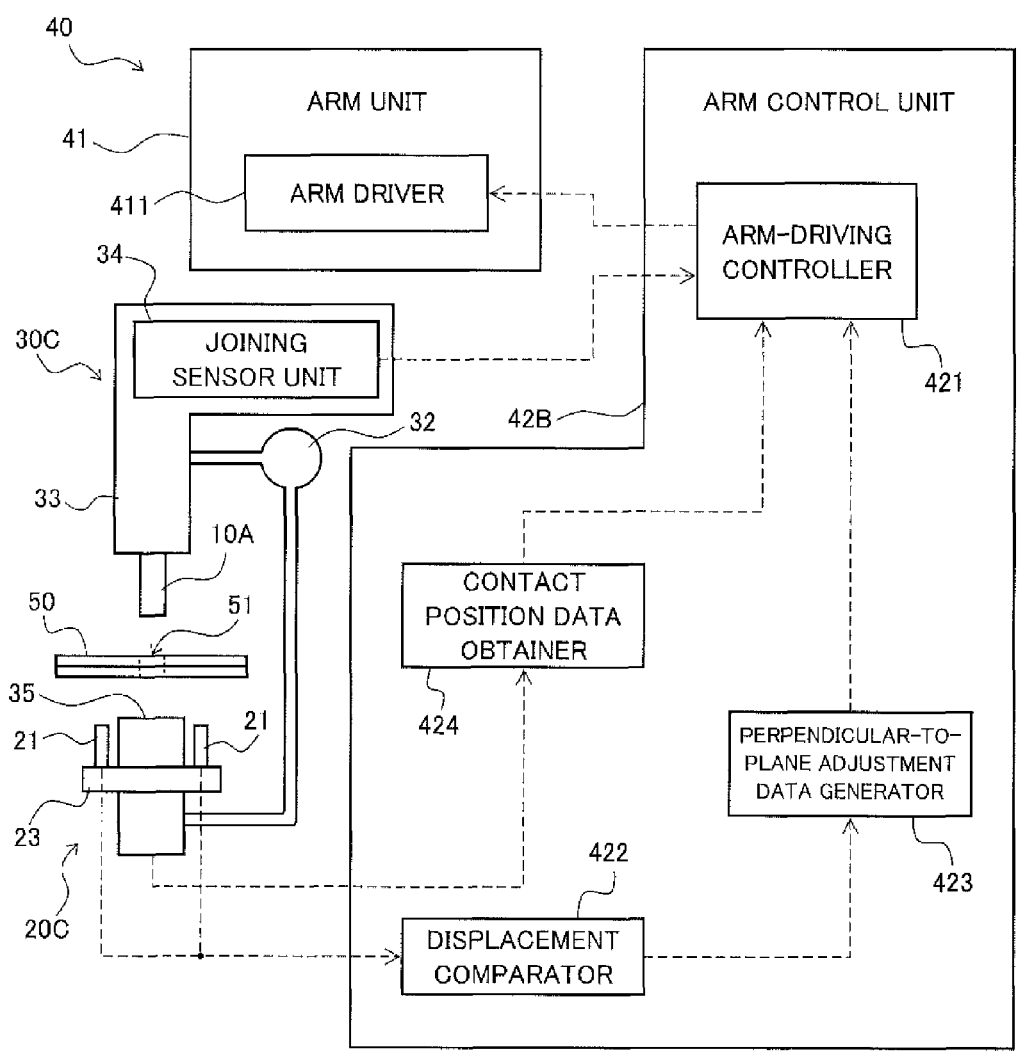
FIG. 12 is a block diagram showing another configuration example of the friction stir spot welding apparatus of FIG. 10.

It should be noted that the perpendicular-to-plane detector 20C included in the friction stir spot welding unit 30D according to the present embodiment includes the contact sensor 35, which doubles as backing and which is illustratively shown in Embodiment 2 (see FIG. 12). However, the configuration for detecting the perpendicular-to-plane state is of course not limited to the perpendicular-to-plane detector 20C, but may be, for example, the perpendicular-to-plane detector 20A described in Embodiment 1 (including the plurality of position sensors 21 and the backing portion 31) or the perpendicular-to-plane detector 20B described in Embodiment 2 (configured as a separate body from the backing portion 31).

Embodiment 4

In the friction stir spot welding apparatuses according to Embodiments 1 to 3, each of the configurations for detecting the perpendicular-to-plane state (i.e., each of the perpendicular-to-plane detectors 20A to 20C) is configured to detect the perpendicular-to-plane state at the back surface 51b of the workpieces 50. However, the present invention is not thus limited, but may alternatively be configured to detect the perpendicular-to-plane state at the front surface 51a of the workpieces 50. That is, the perpendicular-to-plane detection surface may be either the back surface 51b or the front surface 51a.

Figure 14:
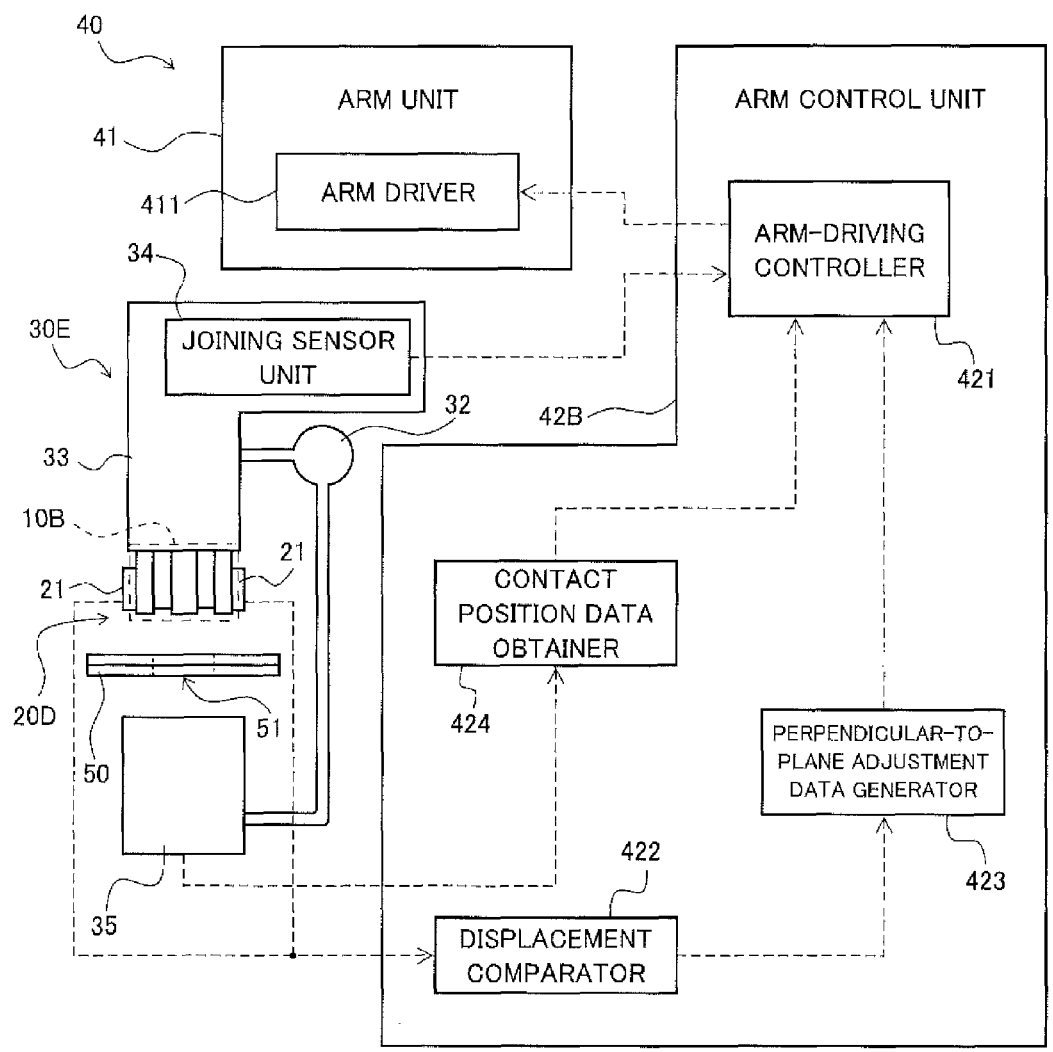
FIG. 14 is a block diagram showing one example of the configuration of a friction stir spot welding apparatus according to Embodiment 4 of the present invention.

For example, as shown in FIG. 14, a friction stir spot welding apparatus according to Embodiment 4 includes the double-acting rotary tool 10B similar to Embodiment 3. However, in Embodiment 4, the plurality of position sensors 21 are not provided at the back surface 51b side of the workpieces 50, but are mounted on the clamp member positioned at the outermost periphery of the rotary tool 10B. That is, in the friction stir spot welding apparatus shown in FIG. 14, a perpendicular-to-plane detector 20D is integrally provided on the clamp member (in other words, on the rotary tool 10B).

It should be noted that a friction stir spot welding unit 30E according to the present embodiment is fundamentally the same as the friction stir spot welding unit 30D previously described in Embodiment 3, except that the perpendicular-to-plane detector 20D of the friction stir spot welding unit 30E is integrated with the rotary tool 10B. Further, in the present embodiment, the back surface 51*b* side of the workpieces 50 is provided only with the contact sensor 35, which doubles as backing. However, as an alternative, the back surface 51*b* side of the workpieces 50 may be provided only with the backing portion 31 as in Embodiment 1, or may be provided with the perpendicular-to-plane detector 20B, which is configured as a separate body from the backing portion 31, as in Embodiment 2.

As described above, in the present invention, the detection of the perpendicular-to-plane state may be performed on either the front surface 51*a* or the back surface 51*b* of the workpieces 50. Accordingly, in the case of the friction stir spot welding unit 30A described in Embodiment 1 or the friction stir spot welding unit 30B or 30C described in Embodiment 2, the perpendicular-to-plane detector 20A, 20B, or 20C may be provided at the front surface 51*a* side of the workpieces 50.

Embodiment 5

Figure 15:
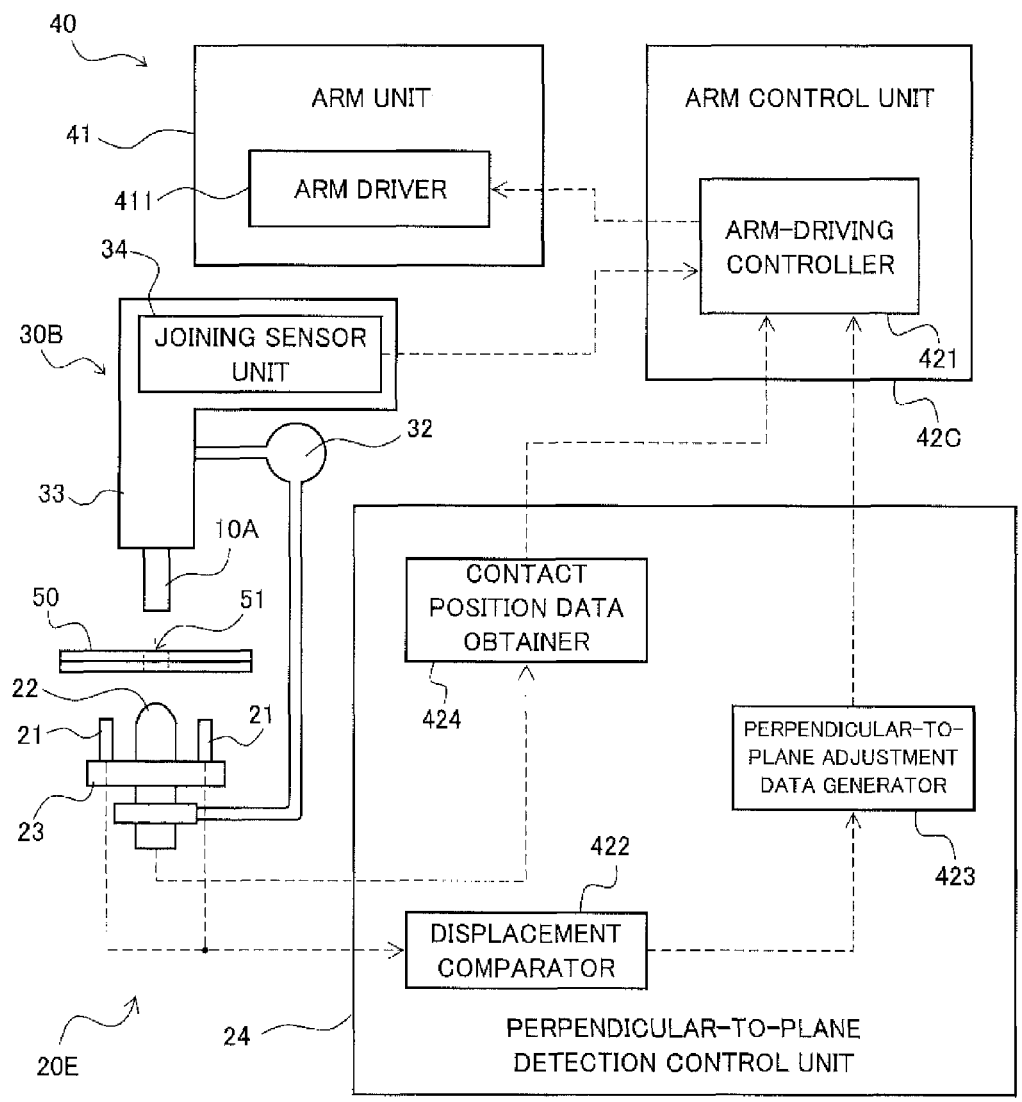
FIG. 15 is a block diagram showing one example of the configuration of a perpendicular-to-plane detection device for use in friction stir spot welding according to Embodiment 5 of the present invention.

In each of the friction stir spot welding apparatuses according to Embodiments 1 to 4, the perpendicular-to-plane detector 20A, 20B, 20C, or 20D is part of the friction stir spot welding apparatus. However, the present invention is not thus limited. As shown in FIG. 15, the configuration for detecting the perpendicular-to-plane state may be independent of the friction stir spot welding apparatus as a perpendicular-to-plane detection device 20E.

The perpendicular-to-plane detection device 20E includes: a detector with the same configuration as that of the perpendicular-to-plane detector 20B of Embodiment 2; and a perpendicular-to-plane detection control unit 24 unique to the perpendicular-to-plane detection device 20E. The perpendicular-to-plane detection control unit 24 includes the displacement comparator 422, the perpendicular-to-plane adjustment data generator 423, and the contact position data obtainer 424 similar to the arm control unit 42B according to Embodiment 2 or 3.

The configuration of a friction stir spot welding apparatus to which the perpendicular-to-plane detection device 20E is applied is the same as the configuration according to Embodiment 2, which is shown in FIG. 10. The friction stir spot welding apparatus includes the single-acting friction stir spot welding unit 30B, and the backing portion 31 is removable from the frame portion 32. Therefore, instead of the backing portion 31, the perpendicular-to-plane detection device 20E according to the present embodiment is mounted to the frame portion 32.

Accordingly, since the perpendicular-to-plane detection device 20E is configured to be independent of the friction stir spot welding apparatus, it is not necessary to newly design a friction stir spot welding apparatus having the configuration according to any one of Embodiments 1 to 3, and the perpendicular-to-plane detection device 20E is applicable to an existing friction stir spot welding apparatus. For example, the perpendicular-to-plane detection control unit 24 of the perpendicular-to-plane detection device 20E and an arm control unit 42C are connected in such a manner as to allow data input/output therebetween, and in such a state, the perpendicular-to-plane detection device 20E is mounted instead of the backing portion 31. In this manner, the same friction stir spot welding apparatus as the one described in Embodiment 2 can be realized.

In a case where the perpendicular-to-plane detection device 20E is applied to an existing friction stir spot welding apparatus, the perpendicular-to-plane detection device 20E may be detachably fixed to the friction stir spot welding apparatus, or may be non-removably (non-detachably) fixed to the friction stir spot welding apparatus. In a case where detachably fixing the perpendicular-to-plane detection device 20E to the friction stir spot welding apparatus is not particularly advantageous, it is preferred to fix the perpendicular-to-plane detection device 20E to the friction stir spot welding apparatus in a non-removable manner. In this case, compared to a configuration where the perpendicular-to-plane detection device 20E is fixed in a detachable manner, for example, positional shifts of the perpendicular-to-plane detection device 20E that occur when the perpendicular-to-plane detection device 20E is mounted/detached can be suppressed, which makes stable detection of the perpendicular-to-plane state possible.

Embodiment 6

In the present invention, each of the perpendicular-to-plane detectors 20A to 20E is required to include three or more position sensors 21, and the position sensors 21 are required to be disposed on the reference plane F in a manner to form a polygon, as previously described in Embodiment 1. In the description herein, the definition of the plurality of position sensors 21 being disposed on the reference plane F includes not only a state where the position sensors 21 are actually on the reference plane F but also a state where, through calibration of the measured distances, the position sensors 21 can be assumed to be (positioned) on the reference plane F.

For example, arbitrary "first conditions" and "second conditions" requiring more strict perpendicular-to-plane detection than the "first conditions" are assumed as conditions for use of a friction stir spot welding apparatus. In a case where the friction stir spot welding apparatus is used under the "first conditions", if the heights of all the position sensors 21 (or the measured distances Dh; see Embodiment 1) are in the "equal distance range" under the "first conditions", then all the position sensors 21 at the time are on the reference plane F.

However, in a case where the friction stir spot welding apparatus is used under the "second conditions", the "equal distance range" under the "second conditions" is narrower than the "equal distance range" under the "first conditions". Therefore, in a case where the same perpendicular-to-plane detector 20A, 20B, 20C, 20D, or 20E is used under both the first conditions and the second conditions, even if all the position sensors 21 are on the reference plane F under one conditions, it may be the case that not all the position sensors 21 are on the reference plane F under the other conditions. Accordingly, in the present embodiment, calibration of the measured distances is performed before the perpendicular-to-plane detection so that even if not all the position sensors 21 are positioned on the reference plane F, all the position sensors 21 will substantially exist on the reference plane F.

Figure 16:
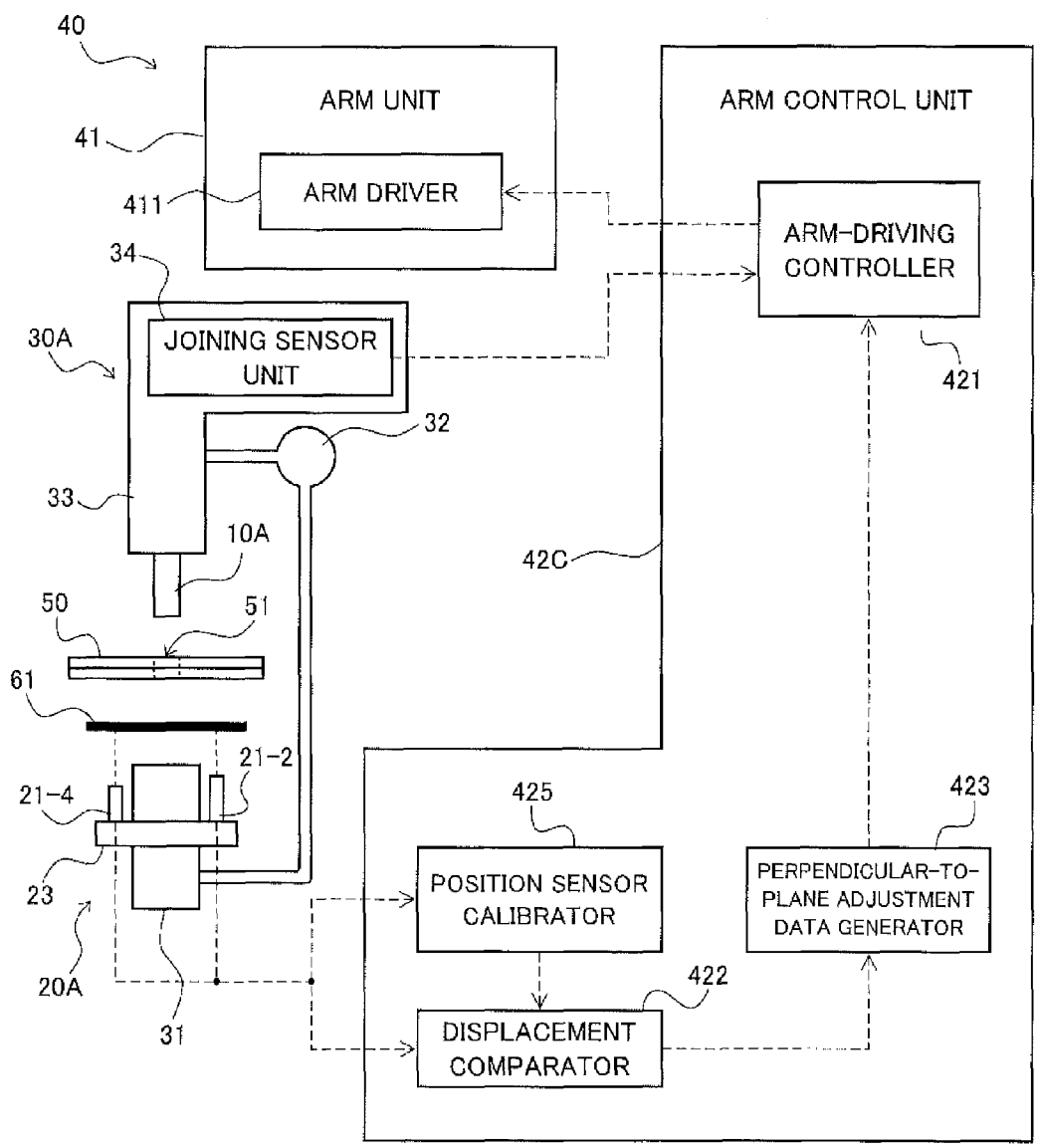
FIG. 16 is a block diagram showing one example of the configuration of a friction stir spot welding apparatus according to Embodiment 6 of the present invention.

Specifically, for example, as shown in FIG. 16, the fundamental configuration of a friction stir spot welding apparatus according to the present embodiment is the same as that of the friction stir spot welding apparatus according to Embodiment 1. However, the friction stir spot welding apparatus according to the present embodiment is different from the friction stir spot welding apparatus according to Embodiment 1, in that the arm control unit 42C of the friction stir spot welding apparatus according to the present embodiment includes a position sensor calibrator 425. Similar to the displacement comparator 422, the position sensor calibrator 425 is configured to receive, as displacements, the distances measured by the plurality of position sensors 21.

Based on the received displacements, the position sensor calibrator 425 generates calibration data for calibrating the distances measured by the position sensors 21, and outputs the calibration data to the displacement comparator 422.

The calibration of the measured distances by the position sensor calibrator 425 may be performed prior to the detection of the perpendicular-to-plane state relative to the joining target portion 51. For example, along the forward and backward movement directions Dp, the position of the rotary tool 10A in the backward movement direction is defined as a "height", and as schematically shown in FIG. 16, for example, the second position sensor 21-2 shown on the right side of FIG. 16 (see FIG. 3 and FIG. 4C) is positioned higher than the fourth position sensor 21-4 shown on the left side of FIG. 16 (see FIG. 3 and FIG. 4C). In this case, the second position sensor 21-2 and the fourth position sensor 21-4 are not on the same plane (reference plane F). (It should be noted that, in the example shown in FIG. 16, the height difference between the second position sensor 21-2 and the fourth position sensor 21-4 is exaggerated.)

Accordingly, in order to calibrate the measured distances of the second position sensor 21-2 and the fourth position sensor 21-4, for example, a calibration flat plate 61 as shown in FIG. 16 is prepared. The specific configuration of the calibration flat plate 61 is not particularly limited, so long as the calibration flat plate 61 is a plate-shaped member with a flat front surface. Moreover, even a different calibration member that is not a plate-shaped member can be used, so long as the calibration member has a flat surface that allows the measured distances of the plurality of position sensors 21 to be calibrated.

Prior to the detection of the perpendicular-to-plane state, distances to the calibration flat plate 61 are measured by the perpendicular-to-plane detector 20A (by the plurality of position sensors 21). Since the distances (displacements) measured by the second position sensor 21-2 and the fourth position sensor 21-4 are inputted to the position sensor calibrator 425 as different values, the position sensor calibrator 425 generates calibration data that offsets the difference between the displacements, and outputs the calibration data to the displacement comparator 422.

Thereafter, the perpendicular-to-plane detector 20A measures distances to the measurement positions P (i.e., displacements), and outputs the distances (displacements) to the displacement comparator 422. The displacement comparator 422 calibrates the displacements by the calibration data, then compares the displacements, and thereafter outputs the comparison result to the perpendicular-to-plane adjustment data generator 423. The perpendicular-to-plane adjustment data generator 423 uses the comparison result of the displacements (distances) to generate perpendicular-to-plane adjustment data as previously described in Embodiment 1, and outputs the perpendicular-to-plane adjustment data to the arm-driving controller 421.

The present invention requires the plurality of position sensors 21 included in each of the perpendicular-to-plane detectors 20A to 20E to be disposed on the reference plane F. In this respect, as described above, the definition of the state where "the plurality of position sensors 21 are disposed on the reference plane F" includes the state where it can be assumed, in measurement, that all the position sensors 21 are disposed on the reference plane F owing to the calibration that is performed, in advance, on the distances measured by the position sensors 21.

Although the present embodiment shows an example where the calibration of the measured distances is performed by the friction stir spot welding apparatus previously described in Embodiment 1, the present invention is of course not limited to this example. The calibration of the measured distances is also suitably applicable, for example, to the friction stir spot welding apparatuses disclosed in Embodiments 2 to 5 (i.e., to the configurations each including the arm control unit 42B including the contact position data obtainer 424).

Embodiment 7

Each of the friction stir spot welding apparatuses according to Embodiments 1 to 6 is installed on the robotics device 40. However, the present invention is not thus limited. Each of the friction stir spot welding apparatuses may be a stationary friction stir spot welding apparatus.

Figure 17:
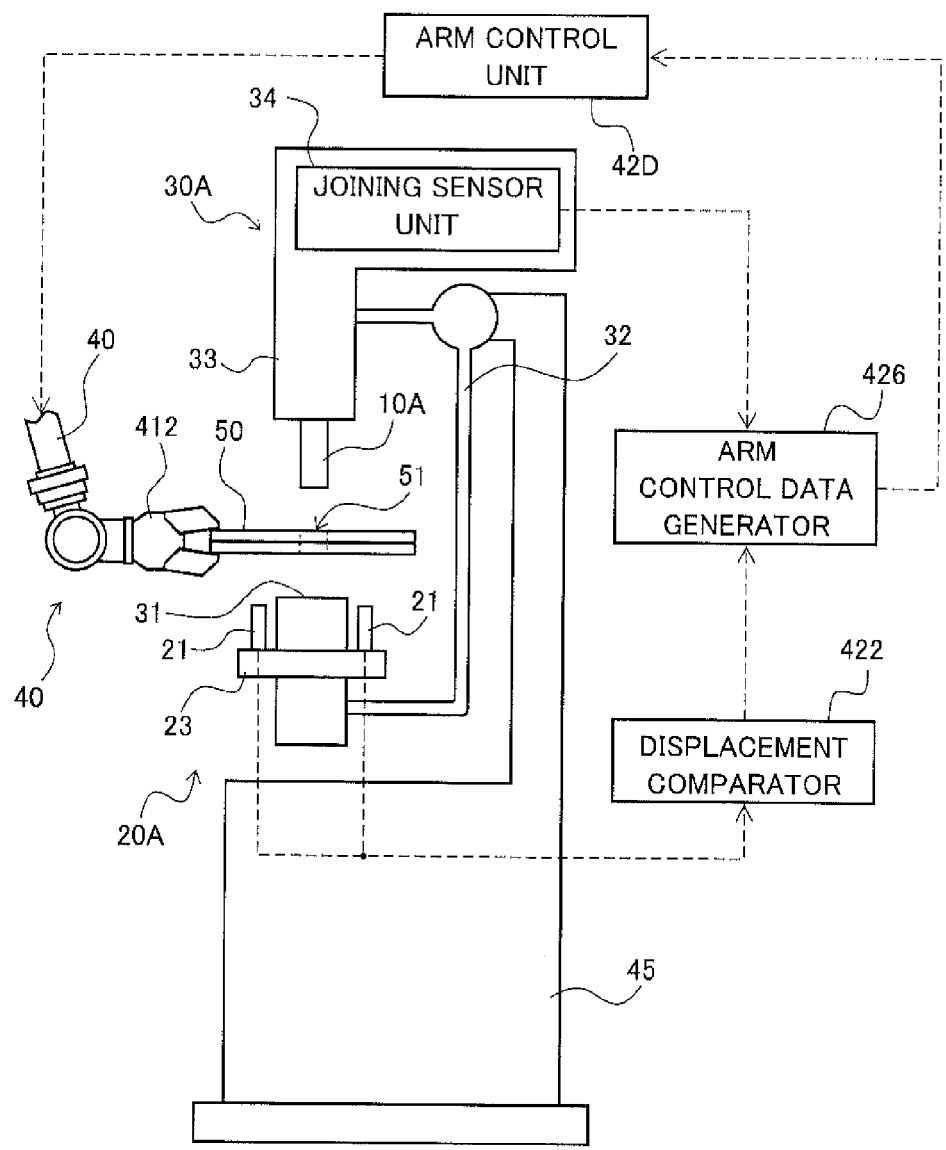
FIG. 17 is a block diagram showing one example of the configuration of a friction stir spot welding apparatus according to Embodiment 7 of the present invention, the configuration including a stationary friction stir spot welding unit.

Specifically, for example, as shown in FIG. 17, a friction stir spot welding apparatus according to Embodiment 7 includes the rotary tool 10A, the perpendicular-to-plane detector 20A, the friction stir spot welding unit 30A, and the displacement comparator 422 similar to the friction stir spot welding apparatus according to Embodiment 1. The friction stir spot welding apparatus according to the present embodiment further includes a base portion 45 and an arm control data generator 426. The base portion 45 is a structure set on the floor in a stationary manner, and fixedly supports the friction stir spot welding unit 30A (including the rotary tool 10A). Accordingly, the rotary tool 10A and the backing portion 31 are provided on the base portion 45 via the frame portion 32.

The arm control data generator 426 generates data for controlling the arm unit 41 (arm control data) based on data detected or measured by the joining sensor unit 34 and data of comparison results of the displacements (distances) compared by the displacement comparator 422, and outputs the generated data to an arm control unit 42D. Similar to the arm control unit 42A described in Embodiment 1 and the arm control unit 42B described in Embodiment 2, the arm control unit 42D includes, for example, the arm-driving controller 421, etc.

The workpieces 50 are held by a holder 412 provided at the tip of the arm unit 41. Accordingly, the arm control unit 42D operates the arm unit 41 based on the arm control data obtained from the arm control data generator 426, such that the joining target portion 51 of the workpieces 50 becomes the perpendicular-to-plane state relative to the rotary tool 10A. That is, in Embodiments 1 to 6, the workpieces 50 are fixedly supported and the position of the rotary tool 10A or 10B is adjusted such that the rotary tool 10A or 10B becomes the perpendicular-to-plane state, whereas in the present embodiment, the rotary tool 10A is fixedly supported and the position of the workpieces 50 is adjusted such that the workpieces 50 become the perpendicular-to-plane state. It should be noted that the specific configuration of the holder 412 is not particularly limited, and a known configuration can be adopted as the configuration of the holder 412. The arm unit 41 may be configured in any manner, so long as the arm unit 41 is configured to hold the workpieces 50. Accordingly, in this case, the arm unit 41 may include known other holding means different from the holder 412.

As described above, in the present invention, the workpieces 50 may be fixedly supported and the position of the rotary tool 10A or 10B may be adjusted, or alternatively, the rotary tool 10A or 10B may be fixedly supported and the position of the workpieces 50 may be adjusted, so long as it can be detected as to whether or not the rotary tool 10A or 10B is in the perpendicular-to-plane state relative to the joining target portion 51 of the workpieces 50.

In Embodiments 1 to 6, the reference plane F is basically set as a plane to which the forward and backward movement directions Dp of the rotary tool 10A are normal. However, if a configuration in which the rotary tool 10A is fixedly supported and the position of the workpieces 50 is adjusted is adopted as in the present embodiment, then the reference plane F may be set, with reference to the contact surface (backing surface) of the backing portion 31, as a plane to which the normal line of the contact surface is normal.

Although not illustrated, each of the robotics devices 40 according to Embodiments 1 to 6 and Embodiment 7 is an articulated robot. However, the robotics device 40 to which the present invention is applicable is not limited to an articulated robot. The present invention is suitably applicable to other robotics devices known in the field of friction stir spot welding. Moreover, the present invention is suitably applicable not only to robotics devices but also to, for example, known machining devices such as NC machine tools, large C frames, and automatic riveters.

In addition, the friction stir spot welding apparatus according to the present embodiment is configured in such a manner that the friction stir spot welding unit 30A and the robotics device 40 are substantially integrated together such that the friction stir spot welding unit 30A and the robotics device 40 operate in conjunction with each other. However, the present invention is not thus limited. For example, the friction stir spot welding unit 30A (the friction stir spot welding apparatus) and the robotics device 40 may be controlled independently of each other, and an operator may operate each of the friction stir spot welding unit 30A and the robotics device 40, or the friction stir spot welding unit 30A and the robotics device 40 may operate in conjunction with each other via a known communication network. Thus, it is not essential for the friction stir spot welding apparatus according to the present invention to include the robotics device 40.

Embodiment 8

Each of the friction stir spot welding apparatuses according to Embodiments 1 to 7 is configured to adjust the position of the rotary tool 10A or 10B, or adjust the position of the workpieces 50, through the operation of the robotics device 40, thereby realizing the perpendicular-to-plane state between the rotary tool 10A or 10B and the workpieces 50. As previously mentioned, it is not essential for the friction stir spot welding apparatus according to the present invention to include the robotics device 40. Specifically, for example, as shown in FIG. 18, an operator 63 may hold the workpieces 50 and adjust the position of the workpieces 50.

Figure 18:
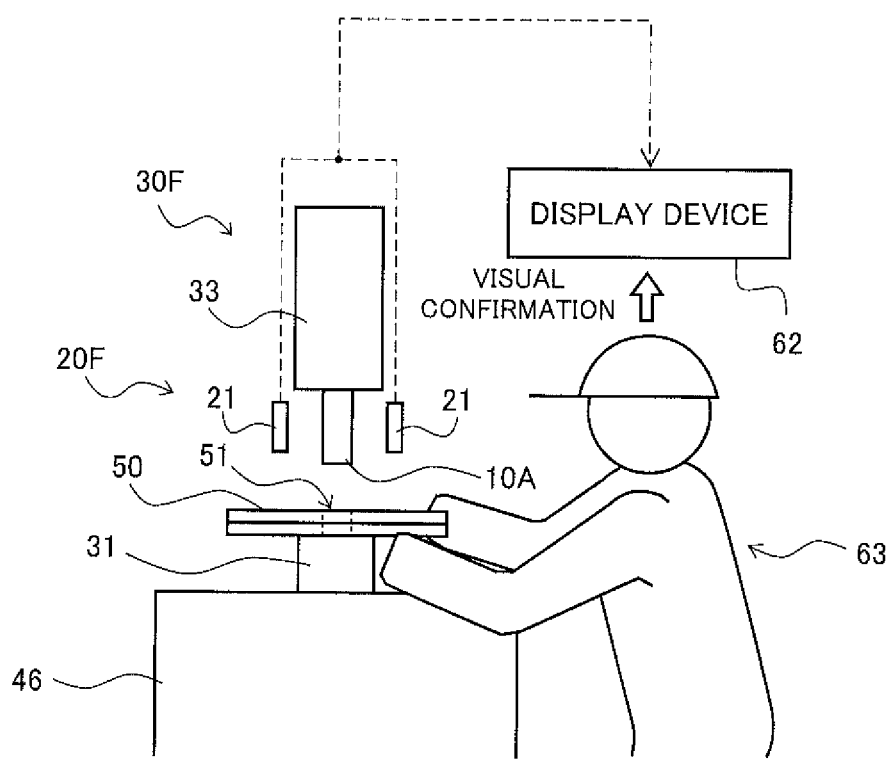
FIG. 18 is a schematic diagram showing one example of the configuration of a friction stir spot welding apparatus according to Embodiment 8 of the present invention.

A friction stir spot welding apparatus shown in FIG. 18 includes at least the rotary tool 10A (i.e., a friction stir spot welding unit 30F) and a perpendicular-to-plane detector 20F. The perpendicular-to-plane detector 20F may be configured in any manner, so long as the perpendicular-to-plane detector 20F can detect that the current state is the perpendicular-to-plane state when all the distances measured by the respective position sensors 21 are equal to each other. Therefore, the friction stir spot welding apparatus according to the present embodiment does not include the configuration that determines whether or not the current state is the perpendicular-to-plane state (i.e., does not include the perpendicular-to-plane state determiner).

The friction stir spot welding apparatus shown in FIG. 18 is connected to a known external display device 62. Accordingly, the distances (displacements) measured by the position sensors 21 of the perpendicular-to-plane detector 20F can be displayed as an image by the display device 62. This allows the operator 63 to adjust the position of the workpieces 50 while visually confirming the display device 62, and thereby the operator 63 can determine whether or not the rotary tool 10A is in the perpendicular-to-plane state relative to the joining target portion 51. Thus, it is not essential for the present invention to include the perpendicular-to-plane state determiner.

The friction stir spot welding apparatus shown in FIG. 18 does not include the backing portion 31. That is, it is also not essential for the present invention to include the backing portion 31. In the case of the friction stir spot welding apparatus shown in FIG. 18, in a state where the operator 63 is holding the workpieces 50, the backing portion 31 is retained on a worktable 46, and the friction stir spot welding apparatus is used, with the workpieces 50 placed on the backing portion 31. The worktable 46 and the backing portion 31 are not part of the friction stir spot welding apparatus, but are components independent of the friction stir spot welding apparatus. The operator 63 may adjust the position of the friction stir spot welding apparatus while visually confirming the display device 62 so that the friction stir spot welding apparatus will be in the perpendicular-to-plane state.

The display device 62 shown in FIG. 18 is an external component provided separately from the friction stir spot welding apparatus. However, the present invention is not thus limited. The friction stir spot welding apparatus according to the present embodiment may alternatively include a "display unit" integrated with the friction stir spot welding unit 30A. Alternatively, the friction stir spot welding apparatus according to the present embodiment may use, for example, an illuminator such as an LED or a notification device outputting a sound, in place of the display device 62 or the display unit. The illuminator or notification device may be integrally provided on the friction stir spot welding apparatus, or may be an external component similar to the display device 62.

As described above, the friction stir spot welding apparatus according to the present invention need not include the perpendicular-to-plane state determiner. In the case of not including the perpendicular-to-plane state determiner, the friction stir spot welding apparatus is required to include a component such as a display device, an illuminator, or a notification device that allows the operator 63 to confirm that the rotary tool 10A and the joining target portion 51 are in the perpendicular-to-plane state, or be configured such that the display device 62 or the like can be connected as an external component to the friction stir spot welding apparatus.

Although the position sensors 21 are disposed parallel to the rotary tool 10A in Embodiments 1 to 8, the present invention is not thus limited. Alternatively, the position sensors 21 may be disposed such that they face the joining target portion 51. In this case, the position sensors 21 are disposed such that they face respective points that are slightly away from each other.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

INDUSTRIAL APPLICABILITY

The present invention can be widely and suitably used in the field of friction stir spot welding since the present invention makes it possible to readily and simply realize the perpendicular-to-plane state between the rotary tool and the workpieces when performing friction stir spot welding.

REFERENCE SIGNS LIST 10A, 10B rotary tool
20A to 20F perpendicular-to-plane detector
21 position sensor
22 contact sensor
24 perpendicular-to-plane detection control unit
30A to 30F friction stir spot welding unit
31 backing portion
32 frame portion
35 contact sensor doubling as backing (backing portion, contact sensor)
40 robotics device
41 arm unit
42A to 42D arm control unit
50 workpiece
51 joining target portion

The invention claimed is:

1. A friction stir spot welding apparatus including a rotary tool that moves forward and backward along a rotational axis, the apparatus pressing a tip of the rotary tool against workpieces and rotating a contacting portion of the tip, the contacting portion being in contact with the workpieces, to soften the workpieces by frictional heat such that the workpieces are stirred and joined together, the friction stir spot welding apparatus comprising:
    a perpendicular-to-plane detector that detects whether or not the rotary tool is positioned to be in a perpendicular-to-plane state relative to a joining target portion of the workpieces, wherein
    the perpendicular-to-plane detector includes position sensors that are disposed on a reference plane to which forward and backward movement directions of the rotary tool are normal, the position sensors measuring distances to at least three measurement positions that are set around the joining target portion, and
    the perpendicular-to-plane detector is configured to detect, based on the distances to the measurement positions, that the rotary tool is positioned to be in the perpendicular-to-plane state relative to the joining target portion of the workpieces.

2. The friction stir spot welding apparatus according to claim 1, wherein
    the position sensors included in the perpendicular-to-plane detector are at least three position sensors, and
    the position sensors are disposed on the reference plane at respective positions that are equally distant from a center of an forward and backward movement path of the rotary tool.

3. The friction stir spot welding apparatus according to claim 1, comprising:
    a backing portion provided at a position that is in the forward movement direction of the rotary tool, the backing portion coming into contact with a back surface of the joining target portion; and
    a frame portion that retains the backing portion and the rotary tool such that the backing portion and the rotary tool face each other, wherein
    the perpendicular-to-plane detector is integrally provided on the backing portion, or is provided at the position of the backing portion in a replaceable manner.

4. The friction stir spot welding apparatus according to claim 3, comprising:
    an arm unit configured to operate in a three-dimensional manner; and
    an arm control unit that controls operation of the arm unit, wherein
    the rotary tool and the backing portion are mounted to the arm unit via the frame portion, and
    the arm control unit controls the operation of the arm unit such that all the distances to the measurement positions, the distances being measured by the perpendicular-to-plane detector, are equal to each other.

5. The friction stir spot welding apparatus according to claim 4, comprising a contact sensor that is integrally provided on the backing portion or is provided at the position of the backing portion in a replaceable manner, wherein
    the arm control unit controls the operation of the arm unit until a contact by the contact sensor is detected.

6. The friction stir spot welding apparatus according to claim 3, comprising a base portion that is set on a floor in a stationary manner, wherein
    the rotary tool and the backing portion are provided on the base portion via the frame portion.

7. The friction stir spot welding apparatus according to claim 6, comprising:
    an arm unit configured to operate in a three-dimensional manner and hold the workpieces; and
    an arm control unit that controls operation of the arm unit, wherein
    the arm control unit controls the operation of the arm unit such that all the distances to the measurement positions, the distances being measured by the perpendicular-to-plane detector, are equal to each other.

8. A friction stir spot welding apparatus including a rotary tool that moves forward and backward along a rotational axis, the apparatus pressing a tip of the rotary tool against workpieces and rotating a contacting portion of the tip, the contacting portion being in contact with the workpieces, to soften the workpieces by frictional heat such that the workpieces are stirred and joined together, the friction stir spot welding apparatus comprising:
    a backing portion provided at a position that is in a forward movement direction of the rotary tool, the backing portion coming into contact with a back surface of the joining target portion;
    a frame portion that retains the backing portion and the rotary tool such that the backing portion and the rotary tool face each other; and
    a perpendicular-to-plane detector that detects whether or not the rotary tool is positioned to be in a perpendicular-to-plane state relative to the joining target portion of the workpieces, wherein
    the perpendicular-to-plane detector includes position sensors that are disposed on a reference plane to which a normal line of a contact surface of the backing portion is normal, the position sensors measuring distances to at least three measurement positions that are set around the joining target portion, and
    the perpendicular-to-plane detector is configured to detect that the rotary tool is positioned to be in the perpendicular-to-plane state relative to the joining target portion of the workpieces if all the distances to the measurement positions are equal to each other.

9. The friction stir spot welding apparatus according to claim 1, wherein
the position sensors included in the perpendicular-to-plane detector are configured to measure distances to four measurement positions that are set around the joining target portion.

10. The friction stir spot welding apparatus according to claim 1, wherein
the position sensors are configured as non-contact sensors.

11. A friction stir spot welding method including a rotary tool that moves forward and backward along a rotational axis, the method including pressing a tip of the rotary tool against workpieces and rotating a contacting portion of the tip, the contacting portion being in contact with the workpieces, to soften the workpieces by frictional heat such that the workpieces are stirred and joined together, the friction stir spot welding method comprising:
measuring distances to at least three measurement positions that are set around the joining target portion on a reference plane to which forward and backward movement directions of the rotary tool are normal; and
detecting that the rotary tool is positioned to be in a perpendicular-to-plane state relative to the joining target portion of the workpieces if all the distances to the measurement positions, the distances being measured before or while the workpieces are being joined together at the joining target portion by the rotary tool, are equal to each other.

12. A perpendicular-to-plane detection device for use in friction stir spot welding, the device being provided in a friction stir spot welding apparatus, the friction stir spot welding apparatus including a rotary tool that moves forward and backward along a rotational axis, the apparatus pressing a tip of the rotary tool against workpieces and rotating a contacting portion of the tip, the contacting portion being in contact with the workpieces, to soften the workpieces by frictional heat such that the workpieces are stirred and joined together,
the perpendicular-to-plane detection device comprising position sensors that are disposed on a reference plane to which forward and backward movement directions of the rotary tool are normal, the position sensors measuring distances to at least three measurement positions that are set around the joining target portion, wherein
the perpendicular-to-plane detection device detects that the rotary tool is positioned to be in a perpendicular-to-plane state relative to the joining target portion of the workpieces if all the distances to the measurement positions are equal to each other.

13. The friction stir spot welding apparatus according to claim 8, wherein
the position sensors included in the perpendicular-to-plane detector are configured to measure distances to four measurement positions that are set around the joining target portion.

14. The friction stir spot welding apparatus according to claim 8, wherein
the position sensors are configured as non-contact sensors.

\* \* \* \* \*